(12) United States Patent
Guo et al.

(10) Patent No.: US 10,812,394 B2
(45) Date of Patent: Oct. 20, 2020

(54) VIRTUAL NETWORK DEVICE AND RELATED METHOD

(71) Applicant: HUAWEI TECHNOLOGIES CO., LTD., Shenzhen (CN)

(72) Inventors: Dayong Guo, Beijing (CN); Chenxi Hu, Shenzhen (CN); Peng Gao, Shenzhen (CN); Xindong Teng, Shenzhen (CN); Hongtao Guo, Beijing (CN); Shengtao Sun, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 129 days.

(21) Appl. No.: 16/102,745

(22) Filed: Aug. 14, 2018

(65) Prior Publication Data

US 2019/0007322 A1    Jan. 3, 2019

Related U.S. Application Data

(63) Continuation of application No. PCT/CN2017/073373, filed on Feb. 13, 2017.

(30) Foreign Application Priority Data

Feb. 14, 2016 (CN) .......................... 2016 1 00848166

(51) Int. Cl.
*G06F 15/173* (2006.01)
*H04L 12/803* (2013.01)
(Continued)

(52) U.S. Cl.
CPC ........ *H04L 47/125* (2013.01); *G06F 9/45558* (2013.01); *H04L 12/287* (2013.01);
(Continued)

(58) Field of Classification Search
CPC ...... H04W 8/082; H04L 12/06; H04L 47/125; H04L 49/15; H04L 29/06; H04L 67/1017; H04L 12/66; H04L 63/02; H04L 67/1002
See application file for complete search history.

(56) References Cited

U.S. PATENT DOCUMENTS 8,942,235 B1 * 1/2015 Vinapamula Venkata ...................
 H04L 63/02
 370/254
8,953,623 B1 * 2/2015 Eyada ................... H04L 47/125
 370/401
(Continued)

FOREIGN PATENT DOCUMENTS

CN       102946354 A    2/2013
CN       104394083 A    3/2015
(Continued)

OTHER PUBLICATIONS

Dietz Thomas et al: "Enhancing the BRAS through virtualization"; Proceedings of the 2015 1st IEEE Conference on Network Softwarization (NETSOFT), Apr. 13, 2015; pp. 1-5; XP032782149.
(Continued)

*Primary Examiner* — Dustin Nguyen
(74) *Attorney, Agent, or Firm* — Kilpatrick Townsend & Stockton LLP

(57) ABSTRACT

Embodiments of the present invention disclose a virtual network device. The virtual network device is configured to implement a broadband network gateway BNG function, and the virtual network device includes a load balance unit and a first forwarding unit; the load balance unit is configured to: receive a first data packet from a first user terminal, determine the first forwarding unit according to the first data packet and a first correspondence, and send the first data packet to the first forwarding unit, where the first correspondence indicates mapping from the first user terminal to the
(Continued)

first forwarding unit; and the first forwarding unit is configured to receive and forward the first data packet. In addition, the embodiments of the present invention further disclose a method for implementing load sharing in a virtual network device.

16 Claims, 5 Drawing Sheets

(51) Int. Cl.
    *H04L 12/713*     (2013.01)
    *H04L 12/46*     (2006.01)
    *H04L 12/28*     (2006.01)
    *G06F 9/455*     (2018.01)
    *H04L 12/931*     (2013.01)
    *H04L 12/723*     (2013.01)

(52) U.S. Cl.
    CPC ...... *H04L 12/4633* (2013.01); *H04L 12/4641* (2013.01); *H04L 45/586* (2013.01); *H04L 49/354* (2013.01); *G06F 2009/45595* (2013.01); *H04L 45/50* (2013.01)

(56) References Cited

U.S. PATENT DOCUMENTS

| | | | | |
|---|---|---|---|---|
| 8,958,293 | B1* | 2/2015 | Anderson | H04L 67/1002 370/230 |
| 9,485,196 | B1* | 11/2016 | Sankaran | H04L 49/15 |
| 9,807,016 | B1* | 10/2017 | Sarangapani | H04L 47/125 |
| 2004/0264481 | A1* | 12/2004 | Darling | H04L 29/06 370/401 |
| 2008/0101396 | A1* | 5/2008 | Miyata | H04L 12/66 370/408 |
| 2010/0265824 | A1* | 10/2010 | Chao | H04L 12/66 370/235 |
| 2013/0007237 | A1* | 1/2013 | Mehta | H04W 8/082 709/223 |
| 2014/0369204 | A1 | 12/2014 | Anand et al. | |
| 2016/0057108 | A1* | 2/2016 | Hu | H04L 47/125 726/15 |
| 2016/0119165 | A1* | 4/2016 | Keronen | H04L 12/4641 370/254 |
| 2016/0142474 | A1* | 5/2016 | Itsumi | H04L 67/1017 370/390 |
| 2017/0034739 | A1 | 2/2017 | Yuan et al. | |

FOREIGN PATENT DOCUMENTS

| | | |
|---|---|---|
| CN | 104735101 A | 6/2015 |
| CN | 105099898 A | 11/2015 |
| CN | 105610632 A | 5/2016 |
| WO | 2015090035 A1 | 6/2015 |

OTHER PUBLICATIONS

Huawei Technologies (UK); Use Case of Virtual BNG; ETSI Draft; European Telecommunications Standards Institute (ETSI); Apr. 21, 2013; pp. 1-5; XP014152726.

* cited by examiner

VIRTUAL NETWORK DEVICE AND RELATED METHOD

CROSS-REFERENCE TO RELATED APPLICATIONS

This application is a continuation of International Application No. PCT/CN2017/073373, filed on Feb. 13, 2017, which claims priority to Chinese Patent Application No. 201610084816.6, filed on Feb. 14, 2016. The disclosures of the aforementioned applications are hereby incorporated by reference in their entireties.

TECHNICAL FIELD

The present invention relates to the field of communications technologies, and in particular, to a virtual network device and a method for implementing load sharing in a virtual network device.

BACKGROUND

On a network, a broadband network gateway (English: Broadband Network Gateway, BNG for short) is used to provide functions such as authorization access, charging, traffic control, and data forwarding of a network user. For example, a broadband remote access server (English: Broadband Remote Access Server, BRAS for short) is a BNG. Driven by a network virtualization technology and a cloud technology, the network may use a virtual network device to implement a BNG function. The virtual network device may be referred to as a virtual broadband network gateway (English: virtual Broadband Network Gateway, vBNG for short). For example, a virtual broadband remote access server (English: virtual Broadband Remote Access Server, vBRAS for short) is a vBNG.

The vBNG may include a virtual machine (English: virtual machine, VM for short). The vBNG includes a forwarding VM. The forwarding VM is configured to implement a data forwarding function of a network user in the vBNG. However, one vBNG generally supports only one forwarding VM in providing a data forwarding function for a network user. That is, one vBNG cannot support multiple forwarding VMs in providing the data forwarding function for the network user simultaneously. Therefore, it is difficult for the vBNG to flexibly respond to a dynamically changed network service requirement.

SUMMARY

A technical issue to be resolved in this application is to provide a virtual network device and a method and an apparatus for implementing load sharing in a virtual network device, so that a vBNG can support multiple forwarding units in providing a data forwarding function for a network user, and the vBNG can respond to a dynamically changed network service requirement more flexibly.

According to a first aspect, a virtual network device is provided, where the virtual network device is configured to implement a broadband network gateway BNG function, and the virtual network device includes a load balance unit and a first forwarding unit;

the load balance unit is configured to: receive a first data packet from a first user terminal, determine the first forwarding unit according to the first data packet and a first correspondence, and send the first data packet to the first forwarding unit, where the first correspondence indicates mapping from the first user terminal to the first forwarding unit; and the first forwarding unit is configured to receive and forward the first data packet.

In this application, a data packet from a user terminal is distributed by the load balance unit to a forwarding unit according to a correspondence, for forwarding processing. Therefore, data packets received by the virtual network device not only can be distributed by the load balance unit to a same forwarding unit for forwarding processing, but also can be distributed by the load balance unit to multiple different forwarding units for forwarding processing. One vBNG not only can support one forwarding unit in providing a data forwarding function for a network user, but also can support multiple forwarding units in providing a data forwarding function for a network user. In this way, the vBNG can respond to a dynamically changed network service requirement more flexibly.

In a first possible implementation of the first aspect, the virtual network device further includes a first management unit; and the load balance unit is further configured to: before receiving the first data packet, receive a first get-online request packet from the first user terminal, determine the first management unit according to the first get-online request packet and a second correspondence, and send the first get-online request packet to the first management unit, where the second correspondence indicates mapping from the first user terminal to the first management unit.

A get-online request packet from a user terminal may be distributed by the load balance unit to a management unit according to a correspondence, for processing. Therefore, the virtual network device not only can concentrate get-online request packets of all user terminals in a same management unit for processing, but also can distribute get-online request packets of multiple user terminals to multiple management units for processing. One vBNG not only can support one management unit in providing a user management function for a network user, but also can support multiple management units in providing a user management function for a network user simultaneously. In this way, the VBNGK can respond to a dynamically changed network service requirement more flexibly.

With reference to the first possible implementation of the first aspect, in a second possible implementation of the first aspect, the virtual network device further includes a first control unit;

the load balance unit is further configured to: before sending the first get-online request packet to the first management unit, send the first get-online request packet to the first control unit, and receive the first correspondence and the second correspondence that are sent by the first control unit; and the first control unit is configured to: receive the first get-online request packet sent by the load balance unit, generate the first correspondence and the second correspondence according to the first get-online request packet, and send the first correspondence and the second correspondence to the load balance unit.

In a third possible implementation of the first aspect, the virtual network device further includes a second management unit;

the load balance unit is further configured to: before receiving the first data packet, receive a second get-online request packet from the first user terminal, determine the first forwarding unit according to the second get-online request packet and the first correspondence, and send the second get-online request packet to the first forwarding unit; and the first forwarding unit is further configured to: receive the second get-online request packet sent by the load balance unit, determine the second management unit according to the second get-online request packet and a third correspondence, and send the second get-online request packet to the second management unit, where the third correspondence indicates mapping from the first user terminal to the second management unit.

A get-online request packet from a user terminal may be distributed by the load balance unit to a forwarding unit according to a correspondence, and then distributed by the forwarding unit to a management unit according to a correspondence, for processing. Therefore, the virtual network device not only can concentrate get-online request packets of all user terminals in a same management unit for processing, but also can distribute get-online request packets of multiple user terminals to multiple management units for processing. One vBNG not only can support one management unit in providing a user management function for a network user, but also can support multiple management units in providing a user management function for a network user simultaneously. In this way, the VBNGK can respond to a dynamically changed network service requirement more flexibly.

With reference to the third possible implementation of the first aspect, in a fourth possible implementation of the first aspect, the virtual network device further includes a second control unit;

the load balance unit is further configured to: before sending the second get-online request packet to the first forwarding unit, send the second get-online request packet to the second control unit, and receive the first correspondence sent by the second control unit;

the second control unit is configured to: receive the second get-online request packet sent by the load balance unit, generate the first correspondence and the third correspondence according to the second get-online request packet, send the first correspondence to the load balance unit, and send the third correspondence to the first forwarding unit; and the first forwarding unit is further configured to receive the third correspondence sent by the second control unit.

With reference to the third possible implementation of the first aspect, in a fifth possible implementation of the first aspect, the virtual network device further includes a third control unit;

the load balance unit is further configured to: before sending the second get-online request packet to the first forwarding unit, send the first get-online request packet to the third control unit, and receive the first correspondence sent by the third control unit;

the third control unit is configured to: receive the second get-online request packet sent by the load balance unit, generate the first correspondence and the third correspondence according to the second get-online request packet, send the first correspondence to the load balance unit, and send the third correspondence to the second management unit;

the second management unit is further configured to: receive the third correspondence sent by the third control unit, and send the third correspondence to the first forwarding unit; and the first forwarding unit is further configured to receive the third correspondence sent by the second management unit.

In a sixth possible implementation of the first aspect, the virtual network device further includes a fourth control unit;

the fourth control unit is configured to: monitor a forwarding unit load status in the virtual network device, add a second forwarding unit to the virtual network device if it is determined that the forwarding unit load status in the virtual network device meets a preset first expansion condition, generate a fourth correspondence after adding the second forwarding unit, and send the fourth correspondence to the load balance unit, where the fourth correspondence indicates mapping from a second user terminal to the second forwarding unit;

the load balance unit is further configured to: receive the fourth correspondence sent by the fourth control unit, receive a second data packet from the second user terminal, determine the second forwarding unit according to the second data packet and the fourth correspondence, and send the second data packet to the second forwarding unit; and the second forwarding unit is configured to receive and forward the second data packet sent by the load balance unit.

Optionally, for a sixth possible implementation of the first aspect, refer to any one of the first possible implementation to the fifth possible implementation of the first aspect.

The control unit may monitor the forwarding unit load status in the virtual network device, to perform forwarding unit expansion on the virtual network device according to the forwarding unit load status in the virtual network device. In this way, the virtual network device can respond to a dynamically changed network service requirement more flexibly.

With reference to the sixth possible implementation of the first aspect, in a seventh possible implementation of the first aspect, the load balance unit is further configured to: before receiving the second data packet, receive a third get-online request packet from the second user terminal, and send the third get-online request packet to the fourth control unit; and the generating a fourth correspondence after adding the second forwarding unit specifically includes: receiving the third get-online request packet sent by the load balance unit; and generating the fourth correspondence according to the third get-online request packet after adding the second forwarding unit.

With reference to the sixth possible implementation of the first aspect, in an eighth possible implementation of the first aspect, the fourth control unit is further configured to: generate a fifth correspondence after adding the second forwarding unit, and send the fifth correspondence to the load balance unit, where the fifth correspondence indicates mapping from the first user terminal to the second forwarding unit;

the load balance unit is further configured to: receive the fifth correspondence sent by the fourth control unit, replace the first correspondence with the fifth correspondence, receive a third data packet from the first user terminal, determine the second forwarding unit according to the third data packet and the fifth correspondence, and send the third data packet to the second forwarding unit; and the second forwarding unit is configured to receive and forward the third data packet sent by the load balance unit.

In a ninth possible implementation of the first aspect, the virtual network device further includes a fifth control unit and a third forwarding unit;

the fifth control unit is configured to: monitor a forwarding unit load status in the virtual network device; if it is determined that the forwarding unit load status in the virtual network device meets a preset first contraction condition, generate a sixth correspondence, and send the sixth correspondence to the load balance unit; and delete the first forwarding unit from the virtual network device after sending the sixth correspondence, where the sixth correspondence indicates a correspondence from the first user terminal to the third forwarding unit;

the load balance unit is further configured to: receive the sixth correspondence sent by the fifth control unit, replace the first correspondence with the sixth correspondence, receive a fourth data packet from the first user terminal, determine the third forwarding unit according to the fourth data packet and the sixth correspondence, and send the fourth data packet to the third forwarding unit; and the third forwarding unit is configured to receive and forward the fourth data packet sent by the load balance unit.

Optionally, for a ninth possible implementation of the first aspect, refer to any one of the first possible implementation to the fifth possible implementation of the first aspect.

The control unit may monitor the forwarding unit load status in the virtual network device, to perform forwarding unit contraction on the virtual network device according to the forwarding unit load status in the virtual network device. In this way, the virtual network device can respond to a dynamically changed network service requirement more flexibly.

With reference to any one of the first possible implementation to the fifth possible implementation of the first aspect, in a tenth possible implementation of the first aspect, the virtual network device further includes a sixth control unit; and the sixth control unit is configured to: monitor a management unit load status in the virtual network device, and add a third management unit to the virtual network device if it is determined that the management unit load status in the virtual network device meets a preset second expansion condition.

The control unit may monitor the management unit load status in the virtual network device, to perform management unit expansion on the virtual network device according to the management unit load status in the virtual network device. In this way, the virtual network device can respond to a dynamically changed network service requirement more flexibly.

With reference to any one of the first possible implementation to the fifth possible implementation of the first aspect, in a tenth possible implementation of the first aspect, the virtual network device further includes a seventh control unit and a fourth management unit; and the seventh control unit is configured to: monitor a management unit load status in the virtual network device; and if it is determined that the management unit load status in the virtual network device meets a preset second contraction condition, migrate user information in the first management unit to the fourth management unit, and delete the first management unit from the virtual network device after migration is completed; or the seventh control unit is configured to: monitor a management unit load status in the virtual network device; and if it is determined that the management unit load status in the virtual network device meets a preset second contraction condition, migrate user information in the second management unit to the fourth management unit, and delete the second management unit from the virtual network device after migration is completed.

The control unit may monitor the management unit load status in the virtual network device, to perform management unit expansion or contraction on the virtual network device according to the management unit load status in the virtual network device. In this way, the virtual network device can respond to a dynamically changed network service requirement more flexibly.

According to a second aspect, a method for implementing load sharing in a virtual network device is provided, where the virtual network device is configured to implement a broadband service gateway BNG function, and the virtual network device includes a load balance unit and a first forwarding unit; and the method includes: receiving, by the load balance unit, a first data packet from a first user terminal;

determining, by the load balance unit, the first forwarding unit according to the first data packet and a first correspondence, where the first correspondence indicates mapping from the first user terminal to the first forwarding unit;

sending, by the load balance unit, the first data packet to the first forwarding unit; and receiving and forwarding, by the first forwarding unit, the first data packet.

In a first possible implementation of the second aspect, the virtual network device further includes a first management unit; and before the receiving, by the load balance unit, the first data packet, the method further includes:

receiving, by the load balance unit, a first get-online request packet from the first user terminal;

determining, by the load balance unit, the first management unit according to the first get-online request packet and a second correspondence, where the second correspondence indicates mapping from the first user terminal to the first management unit; and sending, by the load balance unit, the first get-online request packet to the first management unit.

With reference to the first possible implementation of the second aspect, in a second possible implementation of the second aspect, the virtual network device further includes a first control unit; and before the sending, by the load balance unit, the first get-online request packet to the first management unit, the method further includes:

sending, by the load balance unit, the first get-online request packet to the first control unit;

receiving, by the first control unit, the first get-online request packet sent by the load balance unit;

generating, by the first control unit, the first correspondence and the second correspondence according to the first get-online request packet;

sending, by the first control unit, the first correspondence and the second correspondence to the load balance unit; and receiving, by the load balance unit, the first correspondence and the second correspondence that are sent by the first control unit.

In a third possible implementation of the second aspect, the virtual network device further includes a second management unit; and before the receiving, by the load balance unit, the first data packet, the method further includes:

receiving, by the load balance unit, a second get-online request packet from the first user terminal;

determining, by the load balance unit, the first forwarding unit according to the second get-online request packet and the first correspondence;

sending, by the load balance unit, the second get-online request packet to the first forwarding unit;

receiving, by the first forwarding unit, the second get-online request packet sent by the load balance unit;

determining, by the first forwarding unit, the second management unit according to the second get-online request packet and a third correspondence, where the third correspondence indicates mapping from the first user terminal to the second management unit; and sending, by the first forwarding unit, the second get-online request packet to the second management unit.

With reference to the third possible implementation of the second aspect, in a fourth possible implementation of the second aspect, the virtual network device further includes a second control unit; and before the sending, by the load balance unit, the second get-online request packet to the first forwarding unit, the method further includes:

sending, by the load balance unit, the second get-online request packet to the second control unit;

receiving, by the second control unit, the second get-online request packet sent by the load balance unit;

generating, by the second control unit, the first correspondence and the third correspondence according to the second get-online request packet;

sending, by the second control unit, the first correspondence to the load balance unit, and sending the third correspondence to the first forwarding unit; and receiving, by the first forwarding unit, the third correspondence sent by the second control unit, and receiving, by the load balance unit, the first correspondence sent by the second control unit.

With reference to the third possible implementation of the second aspect, in a fifth possible implementation of the second aspect, the virtual network device further includes a third control unit; and before the sending, by the load balance unit, the second get-online request packet to the first forwarding unit, the method further includes:

sending, by the load balance unit, the first get-online request packet to the third control unit;

receiving, by the third control unit, the second get-online request packet sent by the load balance unit;

generating, by the third control unit, the first correspondence and the third correspondence according to the second get-online request packet;

sending, by the third control unit, the first correspondence to the load balance unit, and sending the third correspondence to the second management unit;

receiving, by the load balance unit, the first correspondence sent by the third control unit, and receiving, by the second management unit, the third correspondence sent by the third control unit, and sending the third correspondence to the first forwarding unit; and receiving, by the first forwarding unit, the third correspondence sent by the second management unit.

In a sixth possible implementation of the second aspect, the virtual network device further includes a fourth control unit;

the fourth control unit monitors a forwarding unit load status in the virtual network device;

the fourth control unit adds a second forwarding unit to the virtual network device if it is determined that the forwarding unit load status in the virtual network device meets a preset first expansion condition;

the fourth control unit generates a fourth correspondence after adding the second forwarding unit, where the fourth correspondence indicates mapping from a second user terminal to the second forwarding unit;

the fourth control unit sends the fourth correspondence to the load balance unit;

the load balance unit receives the fourth correspondence sent by the fourth control unit;

the load balance unit receives a second data packet from the second user terminal after receiving the fourth correspondence;

the load balance unit determines the second forwarding unit according to the second data packet and the fourth correspondence;

the load balance unit sends the second data packet to the second forwarding unit; and the second forwarding unit is configured to receive and forward the second data packet sent by the load balance unit.

Optionally, for a sixth possible implementation of the second aspect, refer to any one of the first possible implementation to the fifth possible implementation of the second aspect.

With reference to the sixth possible implementation of the second aspect, in a seventh possible implementation of the second aspect, before the receiving, by the load balance unit, the second data packet, the method further includes:

receiving, by the load balance unit, a third get-online request packet from the second user terminal;

sending, by the load balance unit, the third get-online request packet to the fourth control unit; and the generating, by the fourth control unit, a fourth correspondence after adding the second forwarding unit includes: receiving, by the fourth control unit, the third get-online request packet sent by the load balance unit; and generating, by the fourth control unit, the fourth correspondence according to the third get-online request packet after adding the second forwarding unit.

With reference to the sixth possible implementation of the second aspect, in an eighth possible implementation of the second aspect, after the adding, by the fourth control unit, the second forwarding unit, the method further includes:

generating, by the fourth control unit, a fifth correspondence, where the fifth correspondence indicates mapping from the first user terminal to the second forwarding unit;

sending, by the fourth control unit, the fifth correspondence to the load balance unit;

receiving, by the load balance unit, the fifth correspondence sent by the fourth control unit;

replacing, by the load balance unit, the first correspondence with the fifth correspondence;

receiving, by the load balance unit, a third data packet from the first user terminal after replacing the first correspondence with the fifth correspondence;

determining, by the load balance unit, the second forwarding unit according to the third data packet and the fifth correspondence;

sending, by the load balance unit, the third data packet to the second forwarding unit; and receiving and forwarding, by the second forwarding unit, the third data packet sent by the load balance unit.

In a ninth possible implementation of the second aspect, the virtual network device further includes a fifth control unit and a third forwarding unit; and the method further includes:

monitoring, by the fifth control unit, a forwarding unit load status in the virtual network device;

if it is determined that the forwarding unit load status in the virtual network device meets a preset first contraction condition, generating, by the fifth control unit, a sixth correspondence, and sending the sixth correspondence to the load balance unit, where the sixth correspondence indicates a correspondence from the first user terminal to the third forwarding unit;

deleting, by the fifth control unit, the first forwarding unit from the virtual network device after sending the sixth correspondence;

receiving, by the load balance unit, the sixth correspondence sent by the fifth control unit;

replacing, by the load balance unit, the first correspondence with the sixth correspondence;

receiving, by the load balance unit, a fourth data packet from the first user terminal after replacing the first correspondence with the sixth correspondence;

determining, by the load balance unit, the third forwarding unit according to the fourth data packet and the sixth correspondence, and sending the fourth data packet to the third forwarding unit; and the third forwarding unit is configured to receive and forward the fourth data packet sent by the load balance unit.

Optionally, for a ninth possible implementation of the second aspect, refer to any one of the first possible implementation to the fifth possible implementation of the second aspect.

With reference to any one of the first possible implementation to the fifth possible implementation of the second aspect, in a tenth possible implementation of the second aspect, the virtual network device further includes a sixth control unit; and the method further includes:

monitoring, by the sixth control unit, a management unit load status in the virtual network device; and adding, by the sixth control unit, a third management unit to the virtual network device if it is determined that the management unit load status in the virtual network device meets a preset second expansion condition.

With reference to any one of the first possible implementation to the fifth possible implementation of the second aspect, in a tenth possible implementation of the second aspect, the virtual network device further includes a seventh control unit and a fourth management unit; and the method includes:

monitoring, by the seventh control unit, a management unit load status in the virtual network device; and if it is determined that the management unit load status in the virtual network device meets a preset second contraction condition, migrating, by the seventh control unit, user information in the first management unit to the fourth management unit, and deleting the first management unit from the virtual network device after migration is completed; or the method includes:

monitoring, by the seventh control unit, a management unit load status in the virtual network device; and if it is determined that the management unit load status in the virtual network device meets a preset second contraction condition, migrating, by the seventh control unit, user information in the second management unit to the fourth management unit, and deleting the second management unit from the virtual network device after migration is completed.

According to a third aspect, a virtual network device is provided, where the virtual network device is configured to implement a BNG function, all units of the virtual network device are independent physical devices, and the units of the virtual network device include a load balance unit and a forwarding unit;

the load balance unit includes a first memory, a first transceiver, and a first processor connected to both the first memory and the first transceiver, the first memory is configured to store a group of program instructions, and the first processor is configured to invoke the program instructions stored in the first memory, to perform the following operations:

receiving, by the first transceiver, a first data packet from a first user terminal;

determining the forwarding unit according to the first data packet and a first correspondence, where the first correspondence indicates mapping from the first user terminal to the forwarding unit; and sending, by the first transceiver, the first data packet to the forwarding unit; and the forwarding unit includes a second memory, a second transceiver, and a second processor connected to both the second memory and the second transceiver, the second memory is configured to store a group of program instructions, and the second processor is configured to invoke the program instructions stored in the second memory, to perform the following operation:

receiving and forwarding, by the second transceiver, the first data packet.

According to a fourth aspect, a computer device is provided, where the computer device is configured to generate and run a virtual network device, and the virtual network device is configured to implement a BNG function;

the computer device includes a memory, a transceiver, and a processor connected to both the memory and the transceiver, the memory is configured to store a group of program instructions, and the processor is configured to invoke the program instructions stored in the memory to run multiple virtual machines, so as to implement multiple units of the virtual network device;

the virtual machines that run in the processor include a load balance unit and a forwarding unit, where the load balance unit is a virtual machine configured to implement load balancing, and the forwarding unit is a virtual machine that implements a data forwarding function;

the load balance unit is configured to: receive a first data packet from a first user terminal, determine the forwarding unit according to the first data packet and a first correspondence, and send the first data packet to the forwarding unit, where the first correspondence indicates mapping from the first user terminal to the forwarding unit; and the forwarding unit is configured to receive and forward the first data packet.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments recorded in this application, and a person of ordinary skill in the art may still derive other drawings from these accompanying drawings.

DESCRIPTION OF EMBODIMENTS

The inventor finds, by means of research, that a vBNG includes a forwarding VM that provides a data forwarding function for a network user. However, in a conventional vBNG, due to a lack of a processing mechanism for distributing data packets from a user terminal to different forwarding VMs for forwarding, all of the data packets from the user terminal are sent to a same forwarding VM for forwarding processing, and therefore cannot be distributed to multiple different forwarding VMs for forwarding processing. Therefore, the conventional vBNG generally supports only one forwarding VM in providing a data forwarding function for a network user, that is, all data forwarding services need to be concentrated in a same forwarding VM. However, the conventional vBNG cannot support multiple forwarding VMs in providing a data forwarding function for a network user simultaneously, that is, the data forwarding services cannot be distributed to the multiple forwarding VMs. In this case, forwarding VM expansion or contraction cannot be performed flexibly according to a dynamically changed service requirement. Therefore, it is difficult for the conventional vBNG to flexibly respond to the dynamically changed service requirement.

On such basis, in the embodiments of the present invention, a load balance unit and a forwarding unit are disposed in a virtual network device configured to implement a BNG function. In the load balance unit, there is a correspondence used to indicate mapping from a user terminal to the forwarding unit. The load balance unit distributes, according to the correspondence, a data packet from the user terminal to the forwarding unit corresponding to the user terminal, to perform forwarding processing, and the forwarding unit can forward the data packet sent by the load balance unit. Therefore, data packets received by the virtual network device not only can be distributed by the load balance unit to a same forwarding unit for forwarding processing, but also can be distributed by the load balance unit to multiple different forwarding units for forwarding processing. That is, the vBNG not only can support one forwarding unit in providing a data forwarding function for a network user, but also can support multiple forwarding units in providing a data forwarding function for a network user simultaneously. It can be learned that, to adapt to a dynamic change of a data forwarding service requirement, the vBNG can perform forwarding unit expansion or contraction flexibly. Therefore, the vBNG can respond to a dynamically changed network service requirement more flexibly.

Figure 1:
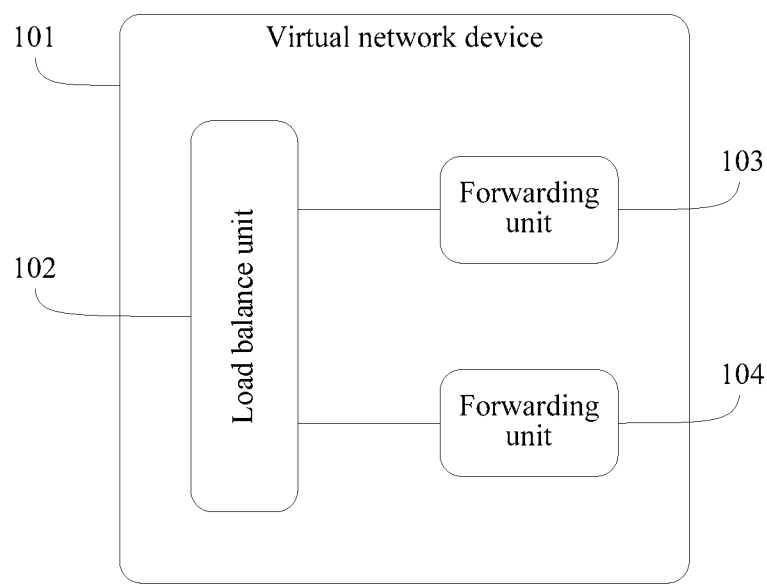
FIG. 1 is a schematic diagram of a framework of a virtual network device in an application scenario according to an embodiment of the present invention.

For example, one of scenarios of the embodiments of the present invention may be a scenario to which a virtual network device 101 shown in FIG. 1 is applied. The virtual network device 101 is configured to implement a BNG function and includes a load balance unit 102, a forwarding unit 103, and a forwarding unit 104. In the load balance unit 102, there is a first correspondence used to indicate mapping from a first user terminal to the forwarding unit 103 and a second correspondence used to indicate mapping from a second user terminal to the forwarding unit 104. When a first data packet from the first user terminal is sent to the virtual network device 101, the load balance unit 102 receives the first data packet, determines the forwarding unit 103 according to the first correspondence and the first data packet, and sends the first data packet to the forwarding unit 103. When receiving the first data packet sent by the load balance unit 102, the forwarding unit 103 forwards the first data packet. When a second data packet from the second user terminal is sent to the virtual network device 101, the load balance unit 102 receives the second data packet, determines the forwarding unit 104 according to the second correspondence and the second data packet, and sends the second data packet to the forwarding unit 104. When receiving the first data packet sent by the load balance unit 102, the forwarding unit 104 forwards the second data packet.

It can be understood that the foregoing scenario is merely a scenario example provided in the embodiments of the present invention, and the embodiments of the present invention are not limited to this scenario. For example, in the embodiments of the present invention, the virtual network device may include only one forwarding unit or may include multiple forwarding units, or a quantity of forwarding units may dynamically increase or decrease in the virtual network device. For another example, the virtual network device may include only one load balance unit or may include multiple load balance units, or a quantity of load balance units may dynamically increase or decrease in the virtual network device.

The following describes, with reference to accompanying drawings by using embodiments, in detail specific implementations of a virtual network device and a method for implementing load sharing in a virtual network device according to the embodiments of the present invention.

Figure 2:
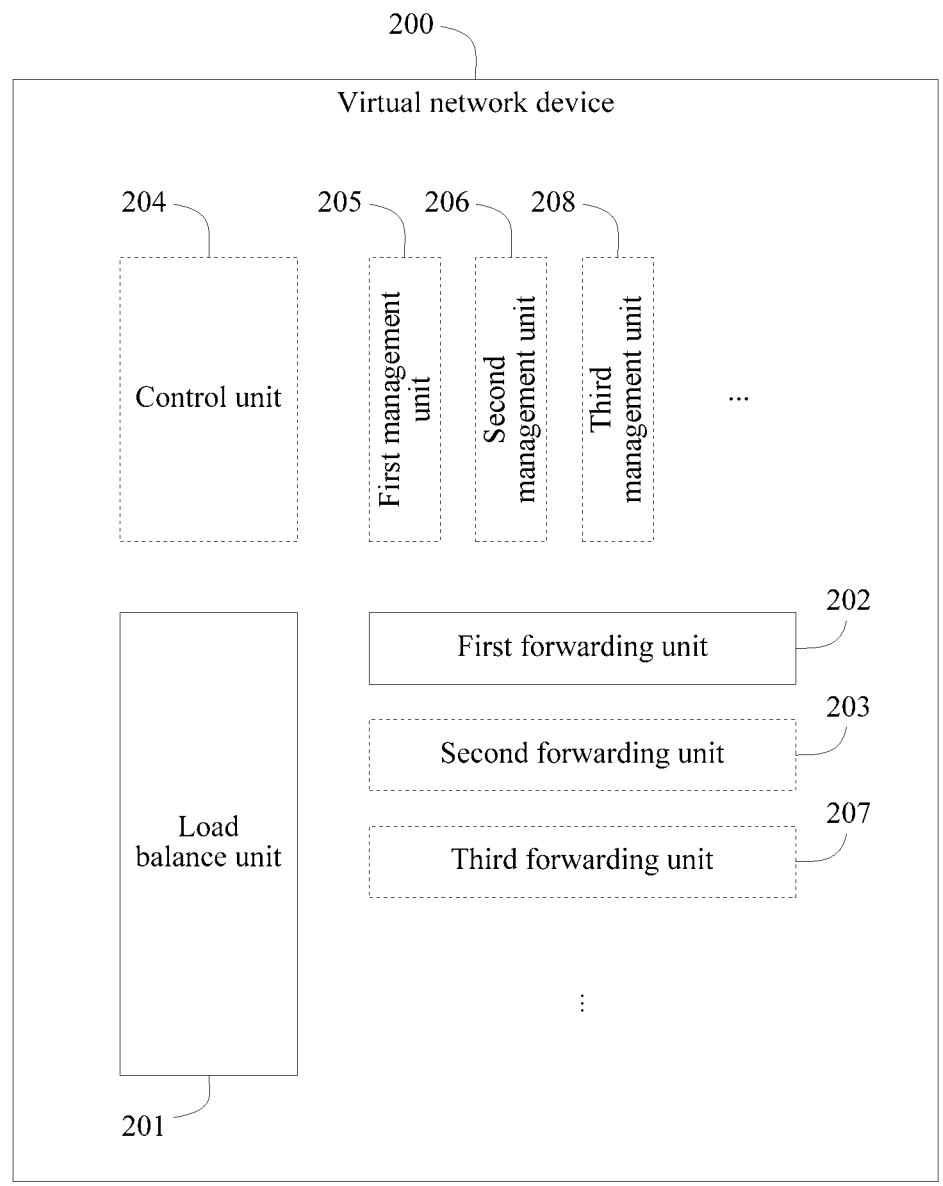
FIG. 2 is a schematic structural diagram of a virtual network device according to an embodiment of the present invention.

Referring to FIG. 2, FIG. 2 is a schematic structural diagram of a virtual network device according to an embodiment of the present invention.

In this embodiment, the virtual network device 200 is configured to implement a broadband network gateway BNG function, and the virtual network device 200 may include, for example, a load balance unit 201 and a first forwarding unit 202.

The load balance unit 201 is configured to: receive a first data packet from a first user terminal, determine the first forwarding unit 202 according to the first data packet and a first correspondence, and send the first data packet to the first forwarding unit 202, where the first correspondence indicates mapping from the first user terminal to the first forwarding unit 202.

The first forwarding unit 202 is configured to receive and forward the first data packet.

If the first user terminal accesses a network by using the virtual network device 200, a data packet from the first user terminal needs to be forwarded to the network by using the virtual network device 200. In this case, the load balance unit stores the first correspondence, and the first correspondence indicates mapping from the first user terminal to the first forwarding unit 202. The first forwarding unit 202 is a forwarding unit in the virtual network device 200. When the first data packet from the first user terminal is sent to the virtual network device 200, the load balance unit 201 receives the first data packet. The load balance unit 201 may determine, according to the first data packet, that the first data packet comes from the first user terminal, and then determine the first forwarding unit 202 according to the first user terminal and the first correspondence, so as to send the first data packet to the first forwarding unit 202. When receiving the first data packet, the first forwarding unit 202 may forward the first data packet according to a forwarding mechanism preset for the first user terminal. In this way, the virtual network device forwards the first data packet to the first user terminal.

For data packets received by the virtual network device 200 from user terminals, the virtual network device 200 uses, for these data packets, a same forwarding processing manner as the foregoing forwarding processing manner of the first data packet. In this way, the virtual network device 200 not only can concentrate data packets from all user terminals in a same forwarding unit for forwarding, but also can distribute data packets from multiple user terminals to multiple forwarding units for forwarding.

For example, when a forwarding unit in the virtual network device 200 includes only the first forwarding unit 202, if both a user terminal A and a user terminal B need to use the virtual network device 200 to forward a data packet to a network, the load balance unit 201 may concentrate a data packet from the user terminal A and a data packet from the user terminal B in the first forwarding unit for forwarding. Specifically, the load balance unit 201 stores a correspondence A and a correspondence B. The correspondence A indicates mapping from the user terminal A to the first forwarding unit 202. The correspondence B indicates mapping from the user terminal B to the first forwarding unit 202. For the data packet from the user terminal A, the load balance unit 201 may send the data packet from the user terminal A to the first forwarding unit 202 according to the correspondence A. For the data packet from the user terminal B, the load balance unit 201 may send the data packet from the user terminal B to the first forwarding unit 202 according to the correspondence B.

For another example, when a forwarding unit in the virtual network device 200 includes the first forwarding unit 202 and a second forwarding unit 203, if both a user terminal A and a user terminal B need to use the virtual network device 200 to forward a data packet to a network, the load balance unit 201 may distribute a data packet from the user terminal A to the first forwarding unit 202 to perform forwarding, and distribute a data packet from the user terminal B to the second forwarding unit 203 to perform forwarding. Specifically, the load balance unit 201 stores a correspondence A and a correspondence B. The correspondence A indicates mapping from the user terminal A to the first forwarding unit 202. The correspondence B indicates mapping from the user terminal B to the second forwarding unit 203. For the data packet from the user terminal A, the load balance unit 201 may send the data packet from the user terminal A to the first forwarding unit 202 according to the correspondence A. For the data packet from the user terminal B, the load balance unit 201 may send the data packet from the user terminal B to the second forwarding unit 202 according to the correspondence B.

A correspondence used to indicate mapping from a user terminal to a forwarding unit may be generated in multiple optional manners.

For example, in an implementation of this embodiment, the correspondence may be generated by the load balance unit 201. Specifically, a load sharing algorithm is set in the load balance unit 201. For a user terminal from which a data packet needs to be distributed by the load balance unit 201 to a forwarding unit, the load balance unit 201 determines, according to the load sharing algorithm, the forwarding unit to which the user terminal is mapped, generates a correspondence based on mapping from the user terminal to the forwarding unit, and stores the correspondence.

For another example, in another implementation of this embodiment, the virtual network device may further include a control unit 204, and the correspondence may be generated by the control unit 204. Specifically, a load sharing algorithm is set in the control unit 204. For a user terminal from which a data packet needs to be distributed by the load balance unit 201 to a forwarding unit, the control unit 204 determines, according to the load sharing algorithm, the forwarding unit to which the user terminal is mapped, generates a correspondence based on mapping from the user terminal to the forwarding unit, and sends the correspondence to the load balance unit 201, so that the load balance unit 201 receives and stores the correspondence.

In this embodiment, the correspondence used to indicate mapping from the user terminal to the forwarding unit may be, for example, mapping entries including a user terminal identifier and a forwarding unit identifier. The user terminal identifier may be, for example, an identity (ID) of a user terminal on a virtual local area network (English: Virtual Local Area Network, VLAN for short), that is, the VLAN ID corresponding to the user terminal. For another example, the user terminal identifier may include a VLAN ID and a Media Access Control (English: Media Access Control, MAC for short) address that are corresponding to a user terminal. For still another example, the user terminal identifier may include an inner VLAN ID, an outer VLAN ID, and a MAC address that are corresponding to a user terminal. For still another example, the user terminal identifier may be a tunnel ID corresponding to a user terminal. For still another example, the user terminal identifier may include a tunnel ID and a MAC address that are corresponding to a user terminal. The tunnel ID corresponding to the user terminal may be a tunnel ID of a generic routing encapsulation (English: Generic Routing Encapsulation, NVGRE for short) tunnel, a VXLAN network identifier (English: VXLAN Network Identifier, VNI for short) of a virtual extensible local area network (English: Virtual eXtensible Local Area Network, VXLAN for short) tunnel, or a label (for example, an incoming label) corresponding to a multiprotocol label switching (English: Multiprotocol Label Switching, MPLS for short) tunnel.

It can be understood that because the virtual network device 200 is configured to implement a BNG function, generally, the virtual network device 200 further includes a management unit configured to provide a user management service for a user terminal. Specifically, the management unit is configured to manage, for example, a get-online/get-offline function, an authorization access function, and a charging function of a user. When the user terminal gets online, the user terminal may send a get-online request packet to the virtual network device 200. The get-online request packet may be processed by the management unit in the virtual network device 200. In this embodiment, similar to a data packet from the user terminal, the get-online request packet from the user terminal may be distributed by the load balance unit 201 to the management unit. In this way, the virtual network device 200 not only can concentrate get-online request packets from all user terminals in a same management unit to perform processing, but also can distribute get-online request packets from multiple user terminals to multiple management units to perform processing. Specifically, two optional get-online request processing manners are provided in this embodiment, for the load balance unit 201 to distribute the get-online request packet to the management unit.

In a first optional get-online request processing manner, the load balance unit 201 stores a correspondence used to indicate mapping from the user terminal to the management unit, and may directly send the get-online request packet from the user terminal to the management unit according to the correspondence. Specifically, the virtual network device 200 may further include a first management unit 205.

The load balance unit 201 is further configured to: before receiving the first data packet, receive a first get-online request packet from the first user terminal, determine the first management unit 205 according to the first get-online request packet and a second correspondence, and send the first get-online request packet to the first management unit. The second correspondence indicates mapping from the first user terminal to the first management unit 205.

The first management unit 205 is configured to: receive the first get-online request packet sent by the load balance unit 201, and determine an Internet Protocol IP address of the first user terminal.

A source IP address of the first data packet is the IP address of the first user terminal.

In a specific implementation, if the first user terminal needs to access a network by using the virtual network device 200, before forwarding a data packet to the network by using the virtual network device 200, the first user terminal needs to send the get-online request packet to the virtual network device 200. In this case, the load balance unit stores the second correspondence, and the second correspondence indicates mapping from the first user terminal to the first management unit 205. The first management unit 205 is a management unit in the virtual network device 200. When the first get-online request packet from the first user terminal is sent to the virtual network device 200, the load balance unit 201 receives the first get-online request packet. The load balance unit 201 may determine, according to the first get-online request packet, that the first get-online request packet comes from the first user terminal, and then determine the first management unit 205 according to the first user terminal and the second correspondence, so as to send the first get-online request packet to the first management unit 205. When receiving the first get-online request packet, the first management unit 205 may provide a get-online/get-offline function, an authorization access function, and a charging function for the first user terminal. For example, the first management unit 205 may specify an IP address for the first user terminal, so that the first user terminal may use the IP address as a source IP address to send a data packet to the network. In this way, the virtual network device provides a BNG service for the first user terminal.

It can be understood that both the correspondence used to indicate mapping from the user terminal to the forwarding unit and the correspondence used to indicate mapping from the user terminal to the management unit may be generated when the user terminal sends a get-online request to the virtual network device 200. Specifically, based on the foregoing first optional get-online request processing manner, the virtual network device may further include a first control unit.

The load balance unit 201 is further configured to: before sending the first get-online request packet to the first management unit 205, send the first get-online request packet to the first control unit, and receive the first correspondence and the second correspondence that are sent by the first control unit.

The first control unit is configured to: receive the first get-online request packet sent by the load balance unit 201, generate the first correspondence and the second correspondence according to the first get-online request packet, and send the first correspondence and the second correspondence to the load balance unit.

The first control unit may be, for example, the control unit 204 mentioned above.

In a specific implementation, if the first user terminal needs to access a network by using the virtual network device 200, before forwarding a data packet to the network by using the virtual network device 200, the first user terminal needs to send the get-online request packet to the virtual network device 200. When the first get-online request packet from the first user terminal is sent to the virtual network device 200, the load balance unit 201 receives the first get-online request packet. The load balance unit 201 may send the first get-online request packet to the first control unit. For the received first get-online request packet, the first control unit determines that the first get-online request packet comes from the first user terminal, determines, according to a load sharing algorithm, the first management unit 205 and the first forwarding unit 202 to which the first user terminal is mapped, generates the first correspondence used to indicate mapping from the first user terminal to the first forwarding unit 202 and a second correspondence used to indicate mapping from the first user terminal to the first management unit 205, and sends both the first correspondence and the second correspondence to the load balance unit 201. The load balance unit 201 receives and stores the first correspondence and the second correspondence. Then, the load balance unit 201 determines, according to the first get-online request packet, that the first get-online request packet comes from the first user terminal, and then determines the first management unit 201 according to the first user terminal and the second correspondence, so as to send the first get-online request packet to the first management unit 205. When receiving the first get-online request packet, the first management unit 205 may provide a get-online/get-offline function, an authorization access function, and a charging function for the first user terminal. For example, the first management unit 205 specifies an IP address for the first user terminal. After the first user terminal gets online, the first user terminal may use the IP address as a source IP address to send the first data packet. When the first data packet from the first user terminal is sent to the virtual network device 200, the load balance unit 201 receives the first data packet. The load balance unit 201 may determine, according to the first data packet, that the first data packet comes from the first user terminal, and then determine the first forwarding unit 202 according to the first user terminal and the first correspondence, so as to send the first data packet to the first forwarding unit 202. When receiving the first data packet, the first forwarding unit 202 may forward the first data packet according to a forwarding mechanism preset for the first user terminal. The first control unit may be, for example, the control unit 204 mentioned above.

In a second optional get-online request processing manner, the load balance unit 201 stores a correspondence used to indicate mapping from the user terminal to the forwarding unit, and may send the get-online request packet from the user terminal to the forwarding unit according to the correspondence. The forwarding unit stores a correspondence used to indicate mapping from the user terminal to the management unit, and may send the get-online request packet from the user terminal to the management unit according to the correspondence. Specifically, the virtual network device 200 may further include a second management unit 206.

The load balance unit 201 is further configured to: before receiving the first data packet, receive a second get-online request packet from the first user terminal, determine the first forwarding unit according to the second get-online request packet and the first correspondence, and send the second get-online request packet to the first forwarding unit.

The first forwarding unit 202 is further configured to: receive the second get-online request packet sent by the load balance unit 201, determine the second management unit 206 according to the second get-online request packet and a third correspondence, and send the second get-online request packet to the second management unit 206. The third correspondence indicates mapping from the first user terminal to the second management unit 206.

The second management unit 206 is configured to: receive the second get-online request packet sent by the first forwarding unit 202, and determine an IP address of the first user terminal.

A source IP address of the first data packet is the IP address of the first user terminal.

In a specific implementation, if the first user terminal needs to access a network by using the virtual network device 200, before forwarding a data packet to the network by using the virtual network device 200, the first user terminal needs to send the get-online request packet to the virtual network device 200. In this case, the load balance unit 201 stores the first correspondence, the first forwarding unit stores the third correspondence. The first correspondence indicates mapping from the first user terminal to the first forwarding unit 202, and the third correspondence indicates mapping from the first user terminal to the second management unit 206. The second management unit 206 is a management unit in the virtual network device 200. When the second get-online request packet from the first user terminal is sent to the virtual network device 200, the load balance unit 201 receives the second get-online request packet. The load balance unit 201 may determine, according to the second get-online request packet, that the second get-online request packet comes from the first user terminal, and then determine the first forwarding unit 202 according to the first user terminal and the first correspondence, so as to send the second get-online request packet to the first forwarding unit 202. After receiving the second get-online request packet, the first forwarding unit 202 may determine, according to the second get-online request packet, that the second get-online request packet comes from the first user terminal, and then determine the second management unit 206 according to the first user terminal and the third correspondence, so as to send the second get-online request packet to the second management unit 206. When receiving the second get-online request packet, the second management unit 206 may provide a get-online/get-offline function, an authorization access function, and a charging function for the first user terminal. For example, the second management unit 206 may specify an IP address for the first user terminal, so that the first user terminal may use the IP address as a source IP address to send a data packet to the network. In this way, the virtual network device provides a BNG service for the first user terminal.

It can be understood that both the correspondence used to indicate mapping from the user terminal to the forwarding unit and the correspondence used to indicate mapping from the user terminal to the management unit may be generated when the user terminal sends a get-online request to the virtual network device 200. For the foregoing second optional get-online request processing manner, the third correspondence may be, for example, directly sent by a control unit to the first forwarding unit 202. Specifically, the virtual network device may further include a second control unit.

The load balance unit 201 is further configured to: before sending the second get-online request packet to the first forwarding unit 202, send the second get-online request packet to the second control unit, and receive the first correspondence sent by the second control unit.

The second control unit is configured to: receive the second get-online request packet sent by the load balance unit 201, generate the first correspondence and the third correspondence according to the second get-online request packet, send the first correspondence to the load balance unit 201, and send the third correspondence to the first forwarding unit 202.

The first forwarding unit 202 is further configured to receive the third correspondence sent by the second control unit.

In a specific implementation, if the first user terminal needs to access a network by using the virtual network device 200, before forwarding a data packet to the network by using the virtual network device 200, the first user terminal needs to send the get-online request packet to the virtual network device 200. When the second get-online request packet from the first user terminal is sent to the virtual network device 200, the load balance unit 201 receives the second get-online request packet. The load balance unit 201 may send the second get-online request packet to the second control unit. For the received second get-online request packet, the second control unit determines that the second get-online request packet comes from the first user terminal, determines, according to a load sharing algorithm, the second management unit 206 and the first forwarding unit 202 to which the first user terminal is mapped, generates the first correspondence used to indicate mapping from the first user terminal to the first forwarding unit 202 and the third correspondence used to indicate mapping from the first user terminal to the second management unit 206, sends the first correspondence to the load balance unit 201, and sends the third correspondence to the first forwarding unit 202. The load balance unit 201 receives and stores the first correspondence. The first forwarding unit 202 receives and stores the third correspondence. Then, the load balance unit 201 determines, according to the second get-online request packet, that the second get-online request packet comes from the first user terminal, and then determines the first forwarding unit 202 according to the first user terminal and the first correspondence, so as to send the second get-online request packet to the first forwarding unit 202. After receiving the second get-online request packet, the first forwarding unit 202 determines, according to the second get-online request packet, that the second get-online request packet comes from the first user terminal, and then determines the second management unit 206 according to the first user terminal and the third correspondence, so as to send the second get-online request packet to the second management unit 206. When receiving the second get-online request packet, the second management unit 206 may provide a get-online/get-offline function, an authorization access function, and a charging function for the first user terminal. For example, the second management unit 206 specifies an IP address for the first user terminal. After the first user terminal gets online, the first user terminal may use the IP address as a source IP address to send the first data packet. When the first data packet from the first user terminal is sent to the virtual network device 200, the load balance unit 201 receives the first data packet. The load balance unit 201 may determine, according to the first data packet, that the first data packet comes from the first user terminal, and then determine the first forwarding unit 202 according to the first user terminal and the first correspondence, so as to send the first data packet to the first forwarding unit 202. When receiving the first data packet, the first forwarding unit 202 may forward the first data packet according to a forwarding mechanism preset for the first user terminal.

For the foregoing second optional get-online request processing manner, the third correspondence may be, for another example, sent by a control unit to the first forwarding unit 202 by using the second management unit 206. Specifically, the virtual network device may further include a third control unit.

The load balance unit 201 is further configured to: before sending the second get-online request packet to the first forwarding unit 202, send the first get-online request packet to the third control unit, and receive the first correspondence sent by the third control unit.

The third control unit is configured to: receive the second get-online request packet sent by the load balance unit 201, generate the first correspondence and the third correspondence according to the second get-online request packet, send the first correspondence to the load balance unit 201, and send the third correspondence to the second management unit 206.

The second management unit 206 is further configured to: receive the third correspondence sent by the third control unit, and send the third correspondence to the first forwarding unit 202.

The first forwarding unit 201 is further configured to receive the third correspondence sent by the second management unit 206.

In a specific implementation, if the first user terminal needs to access a network by using the virtual network device 200, before forwarding a data packet to the network by using the virtual network device 200, the first user terminal needs to send the get-online request packet to the virtual network device 200. When the second get-online request packet from the first user terminal is sent to the virtual network device 200, the load balance unit 201 receives the second get-online request packet. The load balance unit 201 may send the second get-online request packet to the third control unit. For the received second get-online request packet, the third control unit determines that the second get-online request packet comes from the first user terminal, determines, according to a load sharing algorithm, the second management unit 206 and the first forwarding unit 202 to which the first user terminal is mapped, generates the first correspondence used to indicate mapping from the first user terminal to the first forwarding unit 202 and the third correspondence used to indicate mapping from the first user terminal to the second management unit 206, sends the first correspondence to the load balance unit 201, and sends the third correspondence to the second management unit 206. The load balance unit 201 receives and stores the first correspondence. The second management unit 206 sends the third correspondence to the first forwarding unit 202, and the first forwarding unit 202 receives and stores the third correspondence. Then, the load balance unit 201 determines, according to the second get-online request packet, that the second get-online request packet comes from the first user terminal, and then determines the first forwarding unit 202 according to the first user terminal and the first correspondence, so as to send the second get-online request packet to the first forwarding unit 202. After receiving the second get-online request packet, the first forwarding unit 202 determines, according to the second get-online request packet, that the second get-online request packet comes from the first user terminal, and then determines the second management unit 206 according to the first user terminal and the third correspondence, so as to send the second get-online request packet to the second management unit 206. When receiving the second get-online request packet, the second management unit 206 may provide a get-online/get-offline function, an authorization access function, and a charging function for the first user terminal. For example, the second management unit 206 specifies an IP address for the first user terminal. After the first user terminal gets online, the first user terminal may use the IP address as a source IP address to send the first data packet. When the first data packet from the first user terminal is sent to the virtual network device 200, the load balance unit 201 receives the first data packet. The load balance unit 201 may determine, according to the first data packet, that the first data packet comes from the first user terminal, and then determine the first forwarding unit 202 according to the first user terminal and the first correspondence, so as to send the first data packet to the first forwarding unit 202. When receiving the first data packet, the first forwarding unit 202 may forward the first data packet according to a forwarding mechanism preset for the first user terminal.

In this embodiment, because the data packets from the user terminal may be distributed by the load balance unit 201 to different forwarding units, the virtual network device 200 can perform forwarding unit expansion or contraction flexibly. In this way, the virtual network device 200 can respond to a dynamically changed network service requirement more flexibly.

In some implementations, the virtual network device 200 may perform forwarding unit expansion according to a forwarding unit load status, so that the virtual network device 200 can respond to an excessively high data forwarding requirement. Specifically, the virtual network device 200 further includes a fourth control unit. The fourth control unit is configured to: monitor a forwarding unit load status in the virtual network device 200, and add a second forwarding unit 203 to the virtual network device 200 if it is determined that the forwarding unit load status in the virtual network device 200 meets a preset first expansion condition. The fourth control unit may monitor load statuses of all forwarding units in the virtual network device. The load status may be specifically a load parameter, for example, a quantity of user terminals that use a forwarding unit to forward data packets. The first expansion condition may be that a sum of load parameters of all the forwarding units in the virtual network device exceeds a preset first load threshold. In addition, the fourth control unit may use multiple manners to add the second forwarding unit 203 to the virtual network device 200. For example, the fourth control unit may create a VM in the virtual network device 200 to serve as the second forwarding unit 203. For another example, the fourth control unit may add a physical unit to the virtual network device 200 to serve as the second forwarding unit 203.

It can be understood that, after being obtained by means of expansion, the second forwarding unit 203 may be configured to provide a data packet forwarding function for the user terminal. A second data packet from a second user terminal is used as an example. Details are as follows:

The fourth control unit is further configured to: generate a fourth correspondence after adding the second forwarding unit 203, and send the fourth correspondence to the load balance unit 201. The fourth correspondence indicates mapping from the second user terminal to the second forwarding unit 203.

The load balance unit 201 is further configured to: receive the fourth correspondence sent by the fourth control unit, receive the second data packet from the second user terminal, determine the second forwarding unit 203 according to the second data packet and the fourth correspondence, and send the second data packet to the second forwarding unit 203.

The second forwarding unit 203 is configured to receive and forward the second data packet sent by the load balance unit 201.

The second forwarding unit 203 obtained by means of expansion may be configured to forward a data packet for a particular type of user terminal.

For example, the second forwarding unit 203 obtained by means of expansion may be configured to forward a data packet for a user terminal that gets online after expansion is performed. For example, for the second user terminal, the second user terminal may first send a third get-online request packet to the virtual network device 200, and then, after the virtual network device 200 provides a get-online function for the second user terminal according to the third get-online request packet, the second user terminal sends the second data packet to the virtual network device 200. Details are as follows:

The load balance unit 201 is further configured to: before receiving the second data packet, receive the third get-online request packet from the second user terminal, and send the third get-online request packet to the fourth control unit.

The generating a fourth correspondence after adding the second forwarding unit may specifically include the following operations: receiving the third get-online request packet sent by the load balance unit; and generating the fourth correspondence according to the third get-online request packet after adding the second forwarding unit.

In a specific implementation, after adding the second forwarding unit 203 to the virtual network device 200, the fourth control unit may adjust a load sharing algorithm corresponding to a forwarding unit, so that an adjusted load sharing algorithm can be used to determine mapping from the user terminal to the second forwarding unit 203. When the second get-online request packet from the second user terminal is sent to the virtual network device 200, the load balance unit 201 receives the third get-online request packet. The load balance unit 201 may send the third get-online request packet to the fourth control unit. For the received third get-online request packet, the fourth control unit determines that the third get-online request packet comes from the second user terminal, and can determine, after adding the second forwarding unit 203 and adjusting the load sharing algorithm, the second forwarding unit 203 to which the second user terminal is mapped, generate the fourth correspondence used to indicate mapping from the second user terminal to the second forwarding unit 203, and send the fourth correspondence to the load balance unit 201. The load balance unit 201 receives and stores the fourth correspondence. If the virtual network device 200 completes processing of the third get-online request packet, the second user terminal gets online. Then, when the second data packet from the second user terminal is sent to the virtual network device 200, the load balance unit 201 receives the second data packet. The load balance unit 201 may determine, according to the second data packet, that the second data packet comes from the second user terminal, and then determine the second forwarding unit 203 according to the second user terminal and the fourth correspondence, so as to send the second data packet to the second forwarding unit 203. When receiving the second data packet, the second forwarding unit 203 may forward the second data packet according to a forwarding mechanism preset for the second user terminal.

The third get-online request packet may be a get-online request packet received by the fourth control unit after the fourth control unit has added the second forwarding unit 203 to the virtual network device 200. Alternatively, the third get-online request packet may be received by the fourth control unit before the fourth control unit adds the second forwarding unit 203 to the virtual network device 200, that is, the fourth control unit adds the second forwarding unit 203 to the virtual network device 200 after receiving the third get-online request packet.

For another example, the second forwarding unit 203 obtained by means of expansion may be configured to forward a data packet for a user terminal that has been online before expansion is performed. For example, for the first user terminal, before the fourth control unit adds the second forwarding unit 203 to the virtual network device 200, the first user terminal has been online and forwards the first data packet by using the first forwarding unit 202; after the fourth control unit adds the second forwarding unit 203 to the virtual network device 200, a third data packet sent by the first user terminal may be distributed by the load balance unit 201 to the second forwarding unit 203 for forwarding. Details are as follows:

The fourth control unit is further configured to: generate a fifth correspondence after adding the second forwarding unit 203, and send the fifth correspondence to the load balance unit 201. The fifth correspondence 201 indicates mapping from the first user terminal to the second forwarding unit 203.

The load balance unit 201 is further configured to: receive the fifth correspondence sent by the fourth control unit, replace the first correspondence with the fifth correspondence, receive a fourth data packet from the first user terminal, determine the second forwarding unit 203 according to the fourth data packet and the fifth correspondence, and send the fourth data packet to the second forwarding unit 203.

The second forwarding unit 203 is configured to receive and forward the fourth data packet sent by the load balance unit 201.

In a specific implementation, after adding the second forwarding unit 203 to the virtual network device 200, the fourth control unit may adjust a load sharing algorithm corresponding to a forwarding unit, so that an adjusted load sharing algorithm can be used to determine mapping from the user terminal to the second forwarding unit 203. Before the second forwarding unit 203 is added to the virtual network device 200, the load balance unit 201 stores the first correspondence. The first correspondence indicates mapping from the first user terminal to the first forwarding unit 202. In this case, when the first data packet from the first user terminal is sent to the virtual network device 200, the load balance unit 201 receives the first data packet. The load balance unit 201 may determine, according to the first data packet, that the first data packet comes from the first user terminal, and then determine the first forwarding unit 202 according to the first user terminal and the first correspondence, so as to send the first data packet to the first forwarding unit 202. When receiving the first data packet, the first forwarding unit 202 may forward the first data packet according to a forwarding mechanism preset for the first user terminal. After adding the second forwarding unit 203 to the virtual network device 200, the fourth control unit determines, according to the adjusted load sharing algorithm, the second forwarding unit 203 to which the first user terminal is mapped, generates the fifth correspondence used to indicate mapping from the first user terminal to the second forwarding unit 203, and sends the fifth correspondence to the load balance unit 201. After receiving the fifth correspondence, the load balance unit 201 determines that both the fifth correspondence and the stored first correspondence are for the first user terminal, stores the fifth correspondence, and deletes the first correspondence. Then, when the third data packet from the first user terminal is sent to the virtual network device 200, the load balance unit 201 receives the third data packet. The load balance unit 201 may determine, according to the third data packet, that the third data packet comes from the first user terminal, and then determine the second forwarding unit 203 according to the first user terminal and the fifth correspondence, so as to send the third data packet to the second forwarding unit 203. When receiving the third data packet, the second forwarding unit 203 may forward the third data packet according to a forwarding mechanism preset for the first user terminal.

In some implementations, the virtual network device 200 may perform forwarding unit contraction according to a forwarding unit load status, so that the virtual network device 200 can respond to a relatively small data forwarding requirement. Specifically, the virtual network device 200 further includes a fifth control unit. The fifth control unit is configured to: monitor a forwarding unit load status in the virtual network device 200, and delete the first forwarding unit 202 from the virtual network device 200 if it is determined that the forwarding unit load status in the virtual network device 200 meets a preset first contraction condition. The fifth control unit may monitor load statuses of all forwarding units in the virtual network device. The load status may be specifically a load parameter, for example, a quantity of user terminals that use a forwarding unit to forward data packets. The first contraction condition may be that a sum of load parameters of all the forwarding units in the virtual network device does not exceed a preset second load threshold. In addition, the fifth control unit may use multiple manners to delete the first forwarding unit 202 from the virtual network device 200. For example, if the first forwarding unit 202 is a forwarding VM, the fifth control unit may delete the forwarding VM from the virtual network device 200. For another example, if the first forwarding unit 202 is a physical unit, the fifth control unit may remove the physical unit from the virtual network device 200.

It should be noted that during forwarding unit contraction, the to-be-deleted forwarding unit is possibly providing a data forwarding service for some user terminals. Therefore, before the forwarding unit is deleted, all data forwarding services carried on the forwarding unit need to be migrated to another forwarding unit. Using an example of deleting the first forwarding unit 202, the virtual network device 200 further includes a third forwarding unit 207.

The fifth control unit is configured to: if it is determined that the forwarding unit load status in the virtual network device 200 meets a preset first contraction condition, generate a sixth correspondence, and send the sixth correspondence to the load balance unit 201; and delete the first forwarding unit from the virtual network device 200 after sending the sixth correspondence. The sixth correspondence indicates a correspondence from the first user terminal to the third forwarding unit.

The load balance unit 201 is further configured to: receive the sixth correspondence sent by the fifth control unit, replace the first correspondence with the sixth correspondence, receive the third data packet from the first user terminal, determine the third forwarding unit 207 according to the third data packet and the sixth correspondence, and send the third data packet to the third forwarding unit 207.

The third forwarding unit 207 is configured to receive and forward the third data packet sent by the load balance unit 201.

In a specific implementation, before the fifth control unit determines that the forwarding unit load status in the virtual network device 200 meets the preset first contraction condition, the load balance unit 201 stores the first correspondence. The first correspondence indicates mapping from the first user terminal to the first forwarding unit 202. In this case, when the first data packet from the first user terminal is sent to the virtual network device 200, the load balance unit 201 receives the first data packet. The load balance unit 201 may determine, according to the first data packet, that the first data packet comes from the first user terminal, and then determine the first forwarding unit 202 according to the first user terminal and the first correspondence, so as to send the first data packet to the first forwarding unit 202. When receiving the first data packet, the first forwarding unit 202 may forward the first data packet according to a forwarding mechanism preset for the first user terminal. After determining that the forwarding unit load status in the virtual network device 200 meets the preset first contraction condition, the fifth control unit may adjust a load sharing algorithm corresponding to a forwarding unit, so that an adjusted load sharing algorithm cannot be used to determine mapping from any user terminal to the first forwarding unit 202. The fifth control unit determines, according to the adjusted load sharing algorithm, the third forwarding unit 207 to which the first user terminal is mapped, generates the sixth correspondence used to indicate mapping from the first user terminal to the third forwarding unit 207, and send the sixth correspondence to the load balance unit 201. After receiving the sixth correspondence, the load balance unit 201 determines that both the sixth correspondence and the stored first correspondence are for the first user terminal, stores the fifth correspondence, and deletes the first correspondence. Then, when the fourth data packet from the first user terminal is sent to the virtual network device 200, the load balance unit 201 receives the fourth data packet. The load balance unit 201 may determine, according to the fourth data packet, that the fourth data packet comes from the first user terminal, and then determine the third forwarding unit 207 according to the first user terminal and the sixth correspondence, so as to send the fourth data packet to the third forwarding unit 207. When receiving the fourth data packet, the third forwarding unit 207 may forward the fourth data packet according to a forwarding mechanism preset for the first user terminal. It can be understood that after all correspondences for the first forwarding unit 202 are replaced on the load balance unit 201, the fifth control unit may delete the first forwarding unit 202 from the virtual network device 200.

In this embodiment, because the get-online request packets from the user terminal may be distributed by the load balance unit 201 to different management units, the virtual network device 200 can perform management unit expansion or contraction flexibly. In this way, the virtual network device 200 can respond to a dynamically changed network service requirement more flexibly.

In some implementations, the virtual network device 200 may perform management unit expansion according to a management unit load status. In this way, the virtual network device 200 can respond to an excessively high user management service requirement. The user management services include, for example, a get-online/get-offline related management function of a user, assigning an IP address to the user, verifying authorization information of the user during communication with a remote RADIUS server, providing a traffic charging function, or delivering a corresponding forwarding entry to a forwarding unit. Specifically, the virtual network device 200 further includes a sixth control unit. The sixth control unit is configured to: monitor a management unit load status in the virtual network device, and add a third management unit 208 to the virtual network device 200 if it is determined that the management unit load status in the virtual network device 200 meets a preset second expansion condition. The sixth control unit may monitor load statuses of all management units in the virtual network device. The load status may be specifically a load parameter, for example, a quantity of user terminals that use a management unit to perform user management. The second expansion condition may be that a sum of load parameters of all the management units in the virtual network device exceeds a preset third load threshold. In addition, the sixth control unit may use multiple manners to add the third management unit 208 to the virtual network device 200. For example, the sixth control unit may create a VM in the virtual network device 200 to serve as the third management unit 208. For another example, the sixth control unit may add a physical unit to the virtual network device 200 to serve as the third management unit 208.

It can be understood that, after being obtained by means of expansion, the third management unit 208 may be configured to provide a user management service function for the user terminal. For example, a get-online request packet from a user terminal may be distributed by the load balance unit 201 to the third management unit 208 for processing. For a manner of processing the get-online request packet by the virtual network device 200 by using the third management unit 208, refer to a manner of processing the first get-online request packet by the virtual network device 200 by using the first management unit 205, or a manner of processing the second get-online request packet by the virtual network device 200 by using the second management unit 206, and details are not repeated herein in this embodiment.

In some implementations, the virtual network device 200 may perform management unit contraction according to a management unit load status, so that the virtual network device 200 can respond to a requirement on a relatively small user management service. Specifically, the virtual network device 200 further includes a seventh control unit. The seventh control unit is configured to: monitor a management unit load status in the virtual network device 200, and delete the first management unit 205 or the second management unit 206 from the virtual network device 200 if it is determined that the management unit load status in the virtual network device 200 meets a preset second contraction condition. The seventh control unit may monitor load statuses of all management units in the virtual network device 200. The load status may be specifically a load parameter, for example, a quantity of user terminals that use a management unit to perform user management. The second contraction condition may be that a sum of load parameters of all the management units in the virtual network device does not exceed a preset fourth load threshold. In addition, using the first management unit 205 as an example, the seventh control unit may use multiple manners to delete the first management unit 205 from the virtual network device 200. For example, if the first management unit 205 is a management virtual machine, the seventh control unit may delete the management virtual machine from the virtual network device 200. For another example, if the first management unit 205 is a physical unit, the seventh control unit may remove the physical unit from the virtual network device 200. Similarly, if the second management unit 206 is a management virtual machine, the seventh control unit may delete the management virtual machine from the virtual network device 200. If the second management unit 206 is a physical unit, the seventh control unit may remove the physical unit from the virtual network device 200.

It should be noted that during management unit contraction, the to-be-deleted management unit is possibly providing a user management service for some user terminals. Therefore, before the management unit is deleted, all user management services carried on the management unit need to be migrated to another management unit.

Using an example of deleting the first management unit 205, the virtual network device 200 further includes a fourth management unit.

The seventh control unit is further configured to: if it is determined that the management unit load status in the virtual network device meets a preset second contraction condition, migrate user information in the first management unit to the fourth management unit, and delete the first management unit from the virtual network device after migration is completed.

Using an example of deleting the second management unit 206, the virtual network device 200 further includes a fourth management unit.

The seventh control unit is further configured to: if it is determined that the management unit load status in the virtual network device meets a preset second contraction condition, migrate user information in the second management unit to the fourth management unit, and delete the second management unit from the virtual network device after migration is completed.

It can be understood that the first control unit to the seventh control unit that are mentioned in this embodiment all may be the control unit 204 mentioned above, or may be different control units. In this embodiment, both the second forwarding unit and the third forwarding unit are forwarding units different from the first forwarding unit. The second forwarding unit and the third forwarding unit may be a same forwarding unit, or may be different forwarding units. In this embodiment, the first management unit and the second management unit may be a same management unit, or may be different management units. The third management unit is a management unit different from both the first management unit and the second management unit. The fourth management unit is a management unit different from both the first management unit and the second management unit. The third management unit and the fourth management unit may be a same management unit, or may be different management units.

As an example, in the virtual network device 200, control units such as the first control unit, the load balance unit 201, forwarding units such as the first forwarding unit 202, and management units such as the first management unit 205 may be independent physical devices. For example, each control unit is an independent controller, each forwarding unit is an independent forwarder, each management unit is an independent manager, and the load balance unit 201 is an independent load balancer.

As another example, in the virtual network device 200, control units such as the first control unit, the load balance unit 201, forwarding units such as the first forwarding unit 202, and management units such as the first management unit 205 may be virtual machines that share a physical resource. For example, each control unit is a virtual machine configured to implement a control function, each forwarding unit is a virtual machine configured to implement a forwarding function, each management unit is a virtual machine configured to implement a user management function, and the load balance unit 201 is a virtual machine configured to implement load balancing. In this case, the virtual network device 200 may be deployed on one or more physical devices. An entire physical device may be occupied by one virtual machine. Alternatively, a physical device may be occupied by multiple virtual machines jointly.

In this embodiment, the load balance unit and a forwarding unit are disposed in the virtual network device configured to implement the BNG function. In the load balance unit, there is a correspondence used to indicate mapping from a user terminal to the forwarding unit. In this way, the load balance unit distributes, according to the correspondence, a data packet from the user terminal to the forwarding unit to which the user terminal is mapped, to perform forwarding processing; the forwarding unit can forward the data packet sent by the load balance unit. Therefore, data packets received by the virtual network device not only can be distributed by the load balance unit to a same forwarding unit for forwarding processing, but also can be distributed by the load balance unit to multiple different forwarding units for forwarding processing. That is, a vBNG not only can support one forwarding unit in providing a data forwarding function for a network user, but also can support multiple forwarding units in providing a data forwarding function for a network user simultaneously. It can be learned that, to adapt to a dynamic change of a data forwarding service requirement, the vBNG can perform forwarding unit expansion or contraction flexibly. Therefore, the vBNG can respond to a dynamically changed network service requirement more flexibly.

In addition, similar to the data packet from the user terminal, a get-online request packet from the user terminal may be distributed by the load balance unit to a management unit. In this way, the virtual network device not only can concentrate get-online request packets from all user terminals in a same management unit for performing user management, but also can distribute get-online request packets from multiple user terminals to multiple management units for performing user management. It can be learned that, to adapt to a dynamic change of a user management service requirement, the vBNG can perform management unit expansion or contraction flexibly. Therefore, the vBNG can respond to a dynamically changed network service requirement more flexibly.

Figure 3:
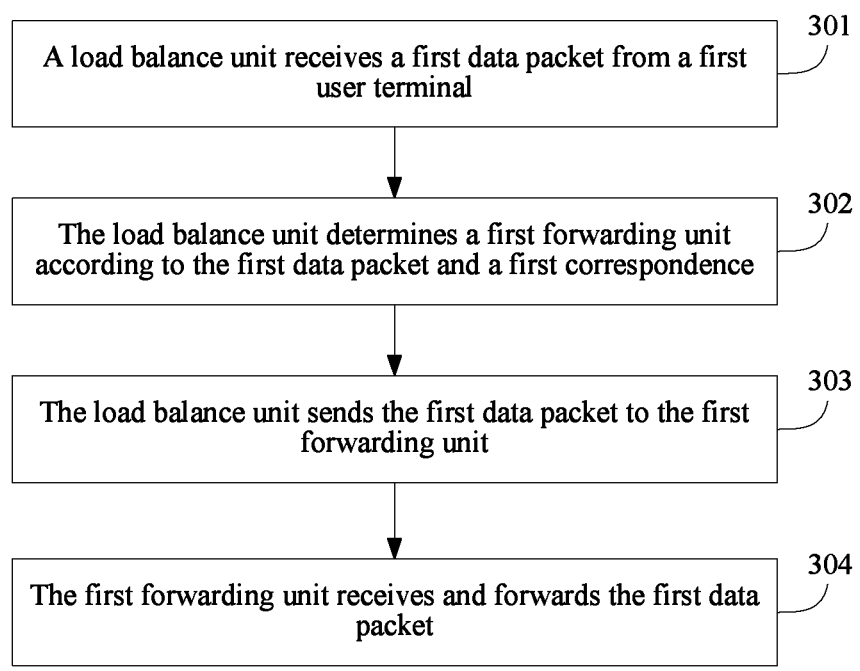
FIG. 3 is a schematic flowchart of a method for implementing load sharing in a virtual network device according to an embodiment of the present invention.

Referring to FIG. 3, FIG. 3 is a schematic flowchart of a method for implementing load sharing in a virtual network device according to an embodiment of the present invention. In this embodiment, the virtual network device is configured to implement a broadband service gateway BNG function, and the virtual network device includes a load balance unit and a first forwarding unit. The method may specifically include, for example, the following steps:

301. The load balance unit receives a first data packet from a first user terminal.

302. The load balance unit determines the first forwarding unit according to the first data packet and a first correspondence, where the first correspondence indicates mapping from the first user terminal to the first forwarding unit.

303. The load balance unit sends the first data packet to the first forwarding unit.

304. The first forwarding unit receives and forwards the first data packet.

It should be noted that the method shown in FIG. 3 may be applied to the virtual network device 200 shown in FIG. 2. The virtual network device mentioned in this embodiment may be the virtual network device 200 mentioned in the embodiment shown in FIG. 2, the load balance unit mentioned in this embodiment may be the load balance unit 201 mentioned in the embodiment shown in FIG. 2, and the first forwarding unit mentioned in this embodiment may be the first forwarding unit 202 mentioned in the embodiment shown in FIG. 2. Therefore, for various specific implementations of the method implemented in the virtual network device in this embodiment, refer to detailed descriptions of the embodiment shown in FIG. 2, and details are not repeated herein.

In this embodiment, the load balance unit and a forwarding unit are disposed in the virtual network device configured to implement the BNG function. In the load balance unit, there is a correspondence used to indicate mapping from a user terminal to the forwarding unit. In this way, the load balance unit distributes, according to the correspondence, a data packet from the user terminal to the forwarding unit to which the user terminal is mapped, to perform forwarding processing; the forwarding unit can forward the data packet sent by the load balance unit. Therefore, data packets received by the virtual network device not only can be distributed by the load balance unit to a same forwarding unit for forwarding processing, but also can be distributed by the load balance unit to multiple different forwarding units for forwarding processing. That is, a vBNG not only can support one forwarding unit in providing a data forwarding function for a network user, but also can support multiple forwarding units in providing a data forwarding function for a network user simultaneously. It can be learned that, to adapt to a dynamic change of a data forwarding service requirement, the vBNG can perform forwarding unit expansion or contraction flexibly. Therefore, the vBNG can respond to a dynamically changed network service requirement more flexibly.

In addition, similar to the data packet from the user terminal, a get-online request packet from the user terminal may be distributed by the load balance unit to a management unit. In this way, the virtual network device not only can concentrate get-online request packets from all user terminals in a same management unit for performing user management, but also can distribute get-online request packets from multiple user terminals to multiple management units for performing user management. It can be learned that, to adapt to a dynamic change of a user management service requirement, the vBNG can perform management unit expansion or contraction flexibly. Therefore, the vBNG can respond to a dynamically changed network service requirement more flexibly.

Figure 4:
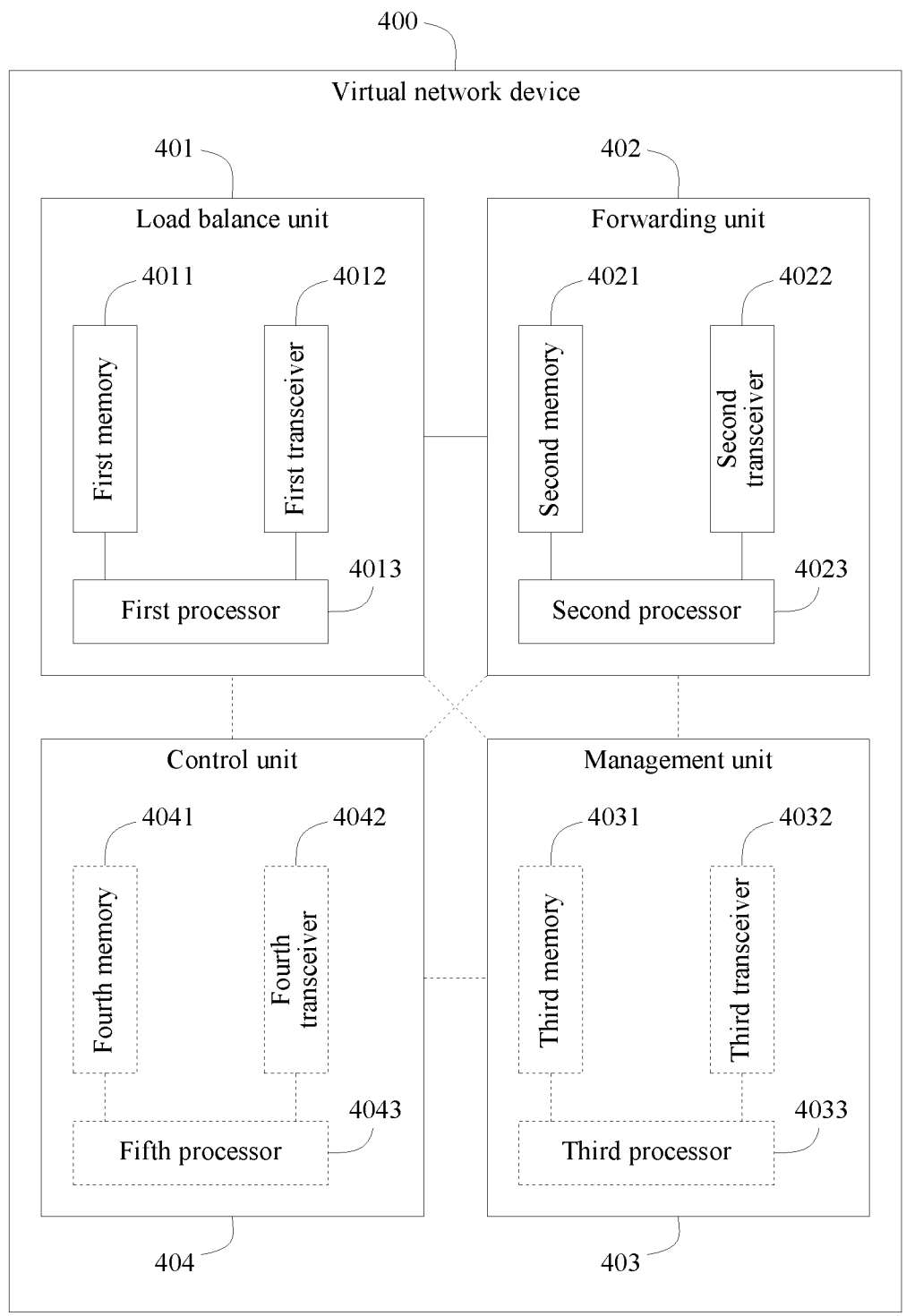
FIG. 4 is a structural diagram of hardware of a virtual network device according to an embodiment of the present invention.

Referring to FIG. 4, FIG. 4 is a structural diagram of hardware of a virtual network device according to an embodiment of the present invention. The virtual network device 400 is configured to implement a BNG function. All units of the virtual network device 400 are independent physical devices. The units of the virtual network device 400 include a load balance unit 401 and a forwarding unit 402.

The load balance unit 401 includes a first memory 4011, a first transceiver 4012, and a first processor 4013 connected to both the first memory 4011 and the first transceiver 4012. The first memory 4011 is configured to store a group of program instructions, and the first processor 4013 is configured to invoke the program instructions stored in the first memory 4011, to perform the following operations:

receiving, by the first transceiver 4012, a first data packet from a first user terminal;

determining the forwarding unit 402 according to the first data packet and a first correspondence, where the first correspondence indicates mapping from the first user terminal to the forwarding unit 402; and sending, by the first transceiver 4012, the first data packet to the forwarding unit 402.

The forwarding unit 402 includes a second memory 4021, a second transceiver 4022, and a second processor 4023 connected to both the second memory 4021 and the second transceiver 4022. The second memory 4021 is configured to store a group of program instructions, and the second processor 4023 is configured to invoke the program instructions stored in the second memory 4021, to perform the following operation:

receiving and forwarding, by the second transceiver 4022, the first data packet.

In a first possible implementation of this embodiment, the units of the virtual network device 400 further include a management unit 403.

The first processor 4013 is further configured to invoke the program instructions stored in the first memory 4011, to perform the following operations:

receiving, by the first transceiver 4012, a first get-online request packet from the first user terminal before receiving the first data packet;

determining the management unit 403 according to the first get-online request packet and a second correspondence, where the second correspondence indicates mapping from the first user terminal to the management unit 403; and sending, by the first transceiver 4012, the first get-online request packet to the management unit 403.

The management unit 403 includes a third memory 4031, a third transceiver 4032 and a third transceiver 4033, and a third processor 4033 connected to both the third memory 4031 and the third transceiver 4032. The third memory 4031 is configured to store a group of program instructions, and the third processor 4033 is configured to invoke the program instructions stored in the third memory 4031, to perform the following operations:

receiving, by the third transceiver 4032, the first get-online request packet sent by the load balance unit 401; and determining an Internet Protocol IP address of the first user terminal, where a source IP address of the first data packet is the IP address of the first user terminal.

With reference to the first possible implementation of this embodiment, in a second possible implementation of this embodiment, the virtual network device 400 further includes a control unit 404.

The first processor 4013 is further configured to invoke the program instructions stored in the first memory 4011, to perform the following operations:

sending, by the first transceiver 4012, the first get-online request packet to the control unit 601 before sending the first get-online request packet to the management unit 403; and triggering the first transceiver 4012 to receive the first correspondence and the second correspondence that are sent by the control unit 404.

The control unit 404 includes a fourth memory 4041, a fourth transceiver 4042, and a fourth processor 4043 connected to both the fourth memory 4041 and the fourth transceiver 4042. The fourth memory 4041 is configured to store a group of program instructions, and the fourth processor 4043 is configured to invoke the program instructions stored in the fourth memory 4041, to perform the following operations:

receiving, by the fourth transceiver 4042, the first get-online request packet sent by the load balance unit 401;

generating the first correspondence and the second correspondence according to the first get-online request packet; and sending, by the fourth transceiver 4042, the first correspondence and the second correspondence to the load balance unit 401.

In a third possible implementation of this embodiment, the virtual network device 400 further includes a management unit 403.

The first processor 4013 is further configured to invoke the program instructions stored in the first memory 4011, to perform the following operations:

receiving, by the first transceiver 4012, a second get-online request packet from the first user terminal before receiving the first data packet;

determining the forwarding unit 402 according to the second get-online request packet and the first correspondence; and sending, by the first transceiver 4012, the second get-online request packet to the forwarding unit 402.

The second processor 4023 is further configured to invoke the program instructions stored in the second memory 4021, to perform the following operations:

receiving, by the second transceiver 4022, the second get-online request packet sent by the load balance unit 401;

determining the management unit 403 according to the second get-online request packet and a third correspondence, where the second correspondence indicates mapping from the first user terminal to the management unit 403; and sending, by the second transceiver 4032, the second get-online request packet to the management unit 403.

The management unit 403 includes a third memory 4031, a third transceiver 4032 and a third transceiver 4033, and a third processor 4033 connected to both the third memory 4031 and the third transceiver 4032. The third memory 4031 is configured to store a group of program instructions, and the third processor 4033 is configured to invoke the program instructions stored in the third memory 4031, to perform the following operations: receiving, by the third transceiver 4032, the second get-online request packet sent by the forwarding unit 402; and determining an IP address of the first user terminal, where a source IP address of the first data packet is the IP address of the first user terminal.

With reference to the third possible implementation of this embodiment, in a fourth possible implementation of this embodiment, the virtual network device 400 further includes a control unit 404.

The first processor 4013 is further configured to invoke the program instructions stored in the first memory 4011, to perform the following operations:

sending, by the first transceiver 4012, the second get-online request packet to the control unit 404 before sending the second get-online request packet to the forwarding unit 402; and receiving, by the first transceiver 4012, the first correspondence sent by the control unit 404.

The control unit 404 includes a fourth memory 4041, a fourth transceiver 4042, and a fourth processor 4043 connected to both the fourth memory 4041 and the fourth transceiver 4042. The fourth memory 4041 is configured to store a group of program instructions, and the fourth processor 4043 is configured to invoke the program instructions stored in the fourth memory 4041, to perform the following operations: receiving, by the fourth transceiver 4042, the second get-online request packet sent by the load balance unit 401;

generating the first correspondence and the second correspondence according to the second get-online request packet; and sending, by the fourth transceiver 4042, the first correspondence to the load balance unit 401, and sending, by the fourth transceiver 4042, the second correspondence to the forwarding unit 402.

The second processor 4023 is further configured to invoke the program instructions stored in the second memory 4021, to perform the following operation:

receiving, by the second transceiver 4042, the second correspondence sent by the control unit 404.

Optionally, the first processor 4013, the second processor 4023, the third processor 4033, and the fourth processor 4043 may be central processing units (English: central processing unit, CPU) or network processors (English: Network Processor, NP for short). The first memory 4011, the second memory 4021, the third memory 4031, and the fourth memory 4041 may be internal memories of a random access memory (English: random access memory, RAM) type. The first transceiver 4012, the second transceiver 4022, the third transceiver 4032, and the fourth transceiver 4042 may include a common physical interface, and the physical interface may be an Ethernet (English: Ethernet) interface or an asynchronous transfer mode (English: Asynchronous Transfer Mode, ATM) interface. The foregoing processors, senders, receivers, and memories can be integrated as one or more independent circuits or hardware, for example, an application-specific integrated circuit (English: application-specific integrated circuit, ASIC).

It should be noted that a structure of the hardware shown in FIG. 4 may be applied to the virtual network device 200 shown in FIG. 2. The virtual network device 200 mentioned in the embodiment shown in FIG. 2 may be implemented as the virtual network device 400 mentioned in this embodiment. The load balance unit 201 mentioned in the embodiment shown in FIG. 2 may be implemented as the load balance unit 401 mentioned in this embodiment. Each of the first forwarding unit 202, the second forwarding unit 203, and the third forwarding unit 207 that are mentioned in the embodiment shown in FIG. 2 may be implemented as the forwarding unit 402 mentioned in this embodiment. Each of the first management unit 205, the second management unit 206, and the third management unit 208 that are mentioned in the embodiment shown in FIG. 2 may be implemented as the management unit 403 mentioned in this embodiment. The control unit 204 mentioned in the embodiment shown in FIG. 2 may be implemented as the control unit 404 mentioned in this embodiment. Therefore, for various specific implementations of performing operations by units of the virtual network device in this embodiment, refer to detailed descriptions of the embodiment shown in FIG. 2, and details are not repeated herein.

Figure 5:
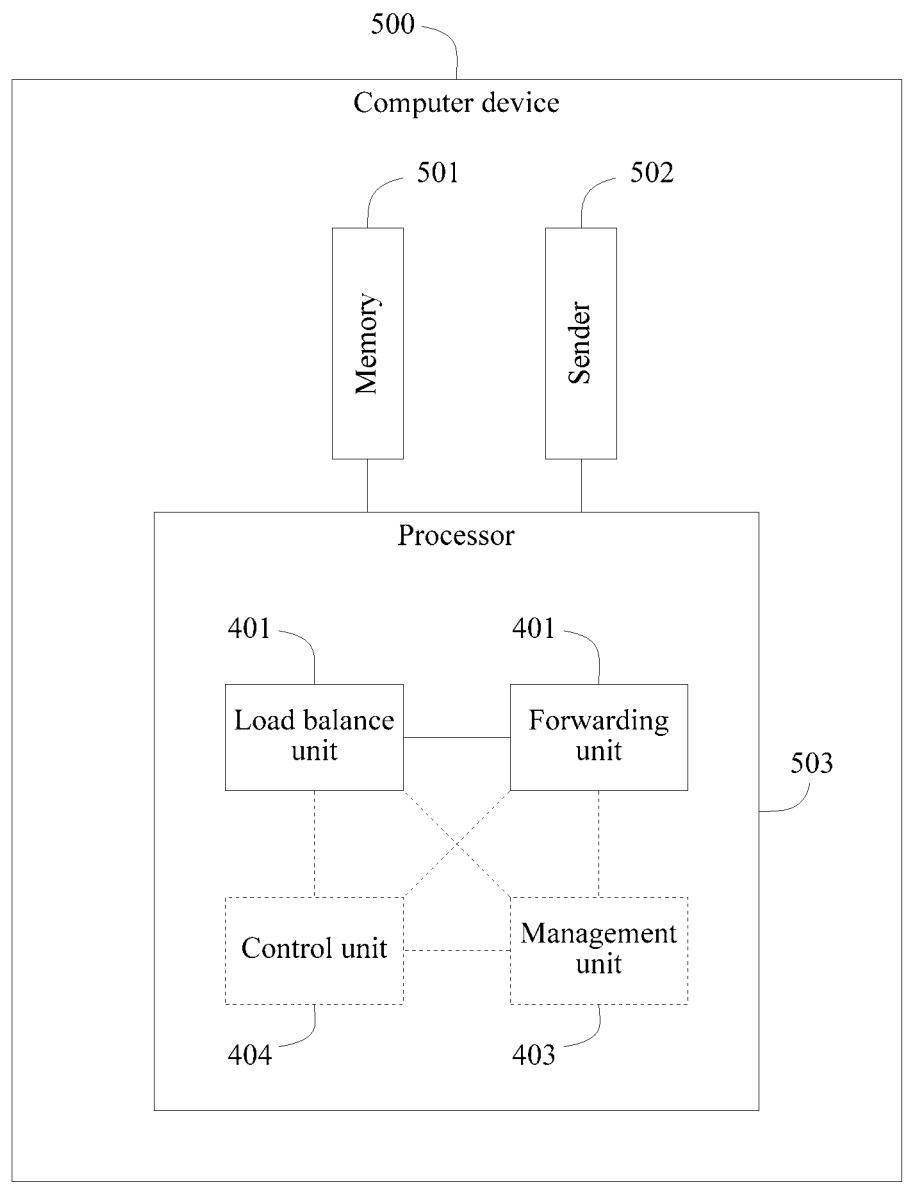
FIG. 5 is a structural diagram of hardware of a virtual network device according to an embodiment of the present invention.

Referring to FIG. 5, FIG. 5 is a structural diagram of hardware of a computer device according to an embodiment of the present invention. The computer device 500 is configured to generate and run a virtual network device. The virtual network device 500 is configured to implement a BNG function.

The computer device 500 includes a memory 501, a transceiver 502, and a processor 503 connected to both the memory 501 and the transceiver 502. The memory 501 is configured to store a group of program instructions. The processor 503 is configured to invoke the program instructions stored in the memory 501 to run multiple virtual machines, so as to implement multiple units of the virtual network device.

The virtual machines that run in the processor 503 include a load balance unit 504 and a forwarding unit 505. The load balance unit 501 is a virtual machine configured to implement load balancing, and the forwarding unit 502 is a virtual machine configured to implement a data forwarding function.

The load balance unit 504 is configured to: receive a first data packet from a first user terminal, determine the forwarding unit according to the first data packet and a first correspondence, and send the first data packet to the forwarding unit, where the first correspondence indicates mapping from the first user terminal to the forwarding unit 505.

The forwarding unit 505 is configured to receive and forward the first data packet.

In a first possible implementation of this embodiment, the virtual machines that run in the processor 503 further include a management unit 506. The management unit 506 is a virtual machine configured to implement a user management function.

The load balance unit 504 is further configured to: before receiving the first data packet, receive a first get-online request packet from the first user terminal, determine the management unit 506 according to the first get-online request packet and a second correspondence, and send the first get-online request packet to the management unit 506, where the second correspondence indicates mapping from the first user terminal to the management unit 505.

With reference to the first possible implementation of this embodiment, in a second possible implementation of this embodiment, the virtual machines that run in the processor 503 further include a control unit 507. The control unit 507 is a virtual machine configured to implement a control function.

The load balance unit 504 is further configured to: before sending the first get-online request packet to the management unit 506, send the first get-online request packet to the control unit 507, and receive the first correspondence and the second correspondence that are sent by the control unit 507.

The control unit 507 is configured to: receive the first get-online request packet sent by the load balance unit 504, generate the first correspondence and the second correspondence according to the first get-online request packet, and send the first correspondence and the second correspondence to the load balance unit 504.

In a third possible implementation of this embodiment, the virtual machines that run in the processor 503 further include a management unit 506. The management unit 506 is a virtual machine configured to implement a user management function.

The load balance unit 504 is further configured to: before receiving the first data packet, receive a second get-online request packet from the first user terminal, determine the forwarding unit 505 according to the second get-online request packet and the first correspondence, and send the second get-online request packet to the forwarding unit 505.

The forwarding unit 505 is further configured to: receive the second get-online request packet sent by the load balance unit 504, determine the management unit 506 according to the second get-online request packet and a second correspondence, and send the second get-online request packet to the management unit 506, where the second correspondence indicates mapping from the first user terminal to the management unit 506.

With reference to the third possible implementation of this embodiment, in a fourth possible implementation of this embodiment, the virtual machines that run in the processor 503 further include a control unit 507. The control unit 507 is a virtual machine configured to implement a control function.

The load balance unit 504 is further configured to: before sending the second get-online request packet to the forwarding unit 505, send the second get-online request packet to the control unit 507, and receive the first correspondence sent by the control unit 507.

The control unit 507 is configured to: receive the second get-online request packet sent by the load balance unit 504, generate the first correspondence and the second correspondence according to the second get-online request packet, send the first correspondence to the load balance unit 504, and send the second correspondence to the forwarding unit 505.

The forwarding unit 505 is further configured to receive the second correspondence sent by the control unit 507.

With reference to the third possible implementation of this embodiment, in a fifth possible implementation of this embodiment, the virtual network device further includes a control unit 507. The control unit 507 is a virtual machine configured to implement a control function.

The load balance unit 504 is further configured to: before sending the second get-online request packet to the forwarding unit 505, send the first get-online request packet to the control unit 507, and receive the first correspondence sent by the control unit 507.

The control unit 507 is configured to: receive the second get-online request packet sent by the load balance unit 504, generate the first correspondence and the second correspondence according to the second get-online request packet, send the first correspondence to the load balance unit 504, and send the second correspondence to the management unit 506.

The management unit 506 is further configured to: receive the second correspondence sent by the control unit 507, and send the second correspondence to the forwarding unit 505.

The forwarding unit 505 is further configured to receive the second correspondence sent by the management unit 506.

Optionally, the processor 503 may be a central processing unit (English: central processing unit, CPU) or a network processor (English: Network Processor, NP for short). The memory 501 may be an internal memory of a random access memory (English: random access memory, RAM) type. The transceiver 502 may include a common physical interface, and the physical interface may be an Ethernet (English: Ethernet) interface or an asynchronous transfer mode (English: Asynchronous Transfer Mode, ATM) interface. The foregoing processor, transceiver, and memory can be integrated as one or more independent circuits or hardware, for example, an application-specific integrated circuit (English: application-specific integrated circuit, ASIC).

It should be noted that a structure of the hardware shown in FIG. 5 may be applied to the virtual network device 200 shown in FIG. 2. The load balance unit 201 mentioned in the embodiment shown in FIG. 2 may be implemented as the load balance unit 504 mentioned in this embodiment. Each of the first forwarding unit 202, the second forwarding unit 203, and the third forwarding unit 207 that are mentioned in the embodiment shown in FIG. 2 may be implemented as the forwarding unit 505 mentioned in this embodiment. Each of the first management unit 205, the second management unit 206, and the third management unit 208 that are mentioned in the embodiment shown in FIG. 2 may be implemented as the management unit 506 mentioned in this embodiment. The control unit 204 mentioned in the embodiment shown in FIG. 2 may be implemented as the control unit 507 mentioned in this embodiment. Therefore, for various specific implementations of performing operations by units of the computer device in this embodiment, refer to detailed descriptions of the embodiment shown in FIG. 2, and details are not repeated herein.

"First" in names such as "the first forwarding unit", "the first management unit", "the first control unit", "the first data packet", "the first get-online request packet", "the first correspondence", "the first user terminal", "the first processor", "the first memory", "the first receiver", and "the first sender" that are mentioned in the embodiments of the present invention is merely used to identify the names, and does not mean the first in a sequence. The rule is also applicable to "second", "third", "fourth", "fifth", "sixth", "seventh", "eighth", "ninth", "tenth", "eleventh", "twelfth", "thirteenth", or the like.

From the foregoing descriptions of the implementations, a person skilled in the art may clearly understand that some or all steps of the methods in the embodiments may be implemented by software in addition to a universal hardware platform. Based on such an understanding, the technical solutions of the present invention may be implemented in a form of a software product. The computer software product may be stored in a storage medium, such as a read-only memory (English: read-only memory, ROM)/RAM, a magnetic disk, or an optical disc, and includes several instructions for instructing a computer device (which may be a personal computer, a server, or a network communications device such as a router) to perform the methods described in the embodiments or some parts of the embodiments of the present invention.

The embodiments in this specification are all described in a progressive manner, for the same or similar parts in the embodiments, refer to these embodiments, and each embodiment focuses on a difference from other embodiments. Especially, method and apparatus embodiments are basically similar to a system embodiment, and therefore are described briefly. For related parts, refer to partial descriptions in the system embodiment. The described device and system embodiments are merely examples. The modules described as separate parts may or may not be physically separate, and parts displayed as modules may or may not be physical modules, may be located in one position, or may be distributed on a plurality of network units. Some or all the modules may be selected according to actual needs to achieve the objectives of the solutions of the embodiments. A person of ordinary skill in the art may understand and implement the embodiments of the present invention without creative efforts.

The foregoing descriptions are merely implementations of the present invention, but are not intended to limit the protection scope of the present invention. It should be noted that a person of ordinary skill in the art may make certain improvements and polishing without departing from the present invention and the improvements and polishing shall fall within the protection scope of the present invention.

What is claimed is:

1. A virtual network device, comprising:
   one or more processors; and
   one or more memories storing computer-readable instructions, wherein the instructions, when executed by the one or more processors, cause the one or more processors to implement a load balance unit, a first control unit, a first management unit and a first forwarding unit, wherein
   the load balance unit is configured to:
      receive a first get-online request packet from a first user terminal,
      send the first get-online request packet to the first control unit,
      receive a first correspondence and a second correspondence from the first control unit, send, according to the second correspondence, the get-online request packet to the first management unit,
      receive a first data packet from a first user terminal,
      determine the first forwarding unit according to the first data packet and a first correspondence, and
      send the first data packet to the first forwarding unit, wherein the first correspondence indicates mapping from the first user terminal to the first forwarding unit and the second correspondence indicates mapping from the first user terminal to the first management unit;
   the first control unit is configured to:
      receive the first get-online request packet sent by the load balance unit,
      generate the first correspondence and the second correspondence according to the first get-online request packet, and
      send the first correspondence and the second correspondence to the load balance unit; and
   the first forwarding unit is configured to receive and forward the first data packet.

2. The virtual network device according to claim 1, wherein
   the instructions, when executed by the one or more processors, cause the one or more processors to implement a second management unit;
   the load balance unit is further configured to:
      before receiving the first data packet, receive a second get-online request packet from the first user terminal, determine the first forwarding unit according to the second get-online request packet and the first correspondence, and
      send the second get-online request packet to the first forwarding unit; and
   the first forwarding unit is further configured to:
      receive the second get-online request packet sent by the load balance unit, determine the second management unit according to the second get-online request packet and a third correspondence, and
      send the second get-online request packet to the second management unit, wherein the third correspondence indicates mapping from the first user terminal to the second management unit.

3. The virtual network device according to claim 2, wherein
   the instructions, when executed by the one or more processors, cause the one or more processors to implement a second control unit;
   the load balance unit is further configured to:
      before sending the second get-online request packet to the first forwarding unit, send the second get-online request packet to the second control unit, and
      receive the first correspondence sent by the second control unit;
   the second control unit is configured to:
      receive the second get-online request packet sent by the load balance unit, generate the first correspondence and the third correspondence according to the second get-online request packet,
      send the first correspondence to the load balance unit, and
      send the third correspondence to the first forwarding unit; and
   the first forwarding unit is further configured to receive the third correspondence sent by the second control unit.

4. The virtual network device according to claim 2, wherein
   the instructions, when executed by the one or more processors, cause the one or more processors to implement a third control unit;
   the load balance unit is further configured to:
      before sending the second get-online request packet to the first forwarding unit, send the first get-online request packet to the third control unit, and
      receive the first correspondence sent by the third control unit;
   the third control unit is configured to:
      receive the second get-online request packet sent by the load balance unit,
      generate the first correspondence and the third correspondence according to the second get-online request packet,
      send the first correspondence to the load balance unit, and
      send the third correspondence to the second management unit;
   the second management unit is further configured to:
   receive the third correspondence sent by the third control unit, and
      send the third correspondence to the first forwarding unit; and
   the first forwarding unit is further configured to receive the third correspondence sent by the second management unit.

5. The virtual network device according to claim 1, wherein
   the instructions, when executed by the one or more processors, cause the one or more processors to implement a fourth control unit;
   the fourth control unit is configured to:
      monitor a forwarding unit load status in the virtual network device, add a second forwarding unit to the virtual network
device if the forwarding unit load status in the virtual
network device meets a preset first expansion condition, generate a fourth correspondence after adding the second forwarding unit, and send the fourth correspondence to the load balance unit, wherein the fourth correspondence indicates mapping from a second user terminal to the second forwarding unit;

the load balance unit is further configured to:

receive the fourth correspondence sent by the fourth control unit, receive a second data packet from the second user terminal, determine the second forwarding unit according to the second data packet and the fourth correspondence, and send the second data packet to the second forwarding unit; and the second forwarding unit is configured to receive and forward the second data packet sent by the load balance unit.

6. The virtual network device according to claim 5, wherein the load balance unit is further configured to:

before receiving the second data packet, receive a third get-online request packet from the second user terminal, and send the third get-online request packet to the fourth control unit; and, wherein generating the fourth correspondence after adding the second forwarding unit comprises:

receiving the third get-online request packet sent by the load balance unit; and generating the fourth correspondence according to the third get-online request packet after adding the second forwarding unit.

7. The virtual network device according to claim 5, wherein the fourth control unit is further configured to:

generate a fifth correspondence after adding the second forwarding unit, and send the fifth correspondence to the load balance unit, wherein the fifth correspondence indicates mapping from the first user terminal to the second forwarding unit;

the load balance unit is further configured to:

receive the fifth correspondence sent by the fourth control unit, replace the first correspondence with the fifth correspondence, receive a third data packet from the first user terminal, determine the second forwarding unit according to the third data packet and the fifth correspondence, and send the third data packet to the second forwarding unit; and the second forwarding unit is configured to receive and forward the third data packet sent by the load balance unit.

8. The virtual network device according to claim 1, wherein the instructions, when executed by the one or more processors, cause the one or more processors to implement a fifth control unit and a third forwarding unit;

the fifth control unit is configured to:

monitor a forwarding unit load status in the virtual network device;

if the forwarding unit load status in the virtual network device meets a preset first contraction condition, generate a sixth correspondence, and send the sixth correspondence to the load balance unit; and delete the first forwarding unit from the virtual network device after sending the sixth correspondence, wherein the sixth correspondence indicates a mapping from the first user terminal to the third forwarding unit;

the load balance unit is further configured to:

receive the sixth correspondence sent by the fifth control unit, replace the first correspondence with the sixth correspondence, receive a fourth data packet from the first user terminal, determine the third forwarding unit according to the fourth data packet and the sixth correspondence, and send the fourth data packet to the third forwarding unit; and the third forwarding unit is configured to receive and forward the fourth data packet sent by the load balance unit.

9. The virtual network device according to claim 1, wherein the instructions, when executed by the one or more processors, cause the one or more processors to implement a sixth control unit; and the sixth control unit is configured to:

monitor a management unit load status in the virtual network device, and add a third management unit to the virtual network device if the management unit load status in the virtual network device meets a preset second expansion condition.

10. The virtual network device according to claim 1, wherein the instructions, when executed by the one or more processors, cause the one or more processors to implement a seventh control unit and a fourth management unit; and the seventh control unit is configured to:

monitor a management unit load status in the virtual network device; and if the management unit load status in the virtual network device meets a preset second contraction condition, migrate user information in the first management unit to the fourth management unit, and delete the first management unit from the virtual network device after migration is completed; or the seventh control unit is configured to:

monitor a management unit load status in the virtual network device; and if that the management unit load status in the virtual network device meets a preset second contraction condition, migrate user information in the second management unit to the fourth management unit, and delete the second management unit from the virtual network device after migration is completed.

11. A method for implementing load sharing in a virtual network device, wherein the virtual network device is configured to implement a broadband network gateway (BNG) function, and the virtual network device comprises one or more processors, and one or more memories storing computer-readable instructions, wherein the instructions, when executed by the one or more processors, cause the one or more processors to implement a load balance unit, a first control unit, a first management unit and a first forwarding unit, wherein the method comprises:
   receiving, by the load balance unit, a first get-online request packet from a first user terminal;
   sending, by the load balance unit, the first get-online request packet to the first control unit;
   receiving, by the load balance unit, a first correspondence and a second correspondence from the first control unit, wherein the first correspondence indicates mapping from the first user terminal to the first forwarding unit and the second correspondence indicates mapping from the first user terminal to the first management unit;
   sending, by the load balance unit based on the second correspondence, the first get-online request to the first management unit; and
   receiving, by the load balance unit, a first data packet from the first user terminal;
   determining, by the load balance unit, the first forwarding unit according to the first data packet and a first correspondence, wherein the first correspondence indicates mapping from the first user terminal to the first forwarding unit;
   sending, by the load balance unit based on the first correspondence, the first data packet to the first forwarding unit; and
   receiving and forwarding, by the first forwarding unit, the first data packet.

12. The method according to claim 11, wherein the instructions, when executed by the one or more processors, cause the one or more processors to implement a second management unit; and
   before the receiving, by the load balance unit, the first data packet, the method further comprises:
   receiving, by the load balance unit, a second get-online request packet from the first user terminal;
   determining, by the load balance unit, the first forwarding unit according to the second get-online request packet and the first correspondence;
   sending, by the load balance unit, the second get-online request packet to the first forwarding unit;
   receiving, by the first forwarding unit, the second get-online request packet sent by the load balance unit;
   determining, by the first forwarding unit, the second management unit according to the second get-online request packet and a third correspondence, wherein the third correspondence indicates mapping from the first user terminal to the second management unit; and
   sending, by the first forwarding unit, the second get-online request packet to the second management unit.

13. The method according to claim 12, wherein the instructions, when executed by the one or more processors, cause the one or more processors to implement a second control unit; and
   before the sending, by the load balance unit, the second get-online request packet to the first forwarding unit, the method further comprises:
   sending, by the load balance unit, the second get-online request packet to the second control unit;
   receiving, by the second control unit, the second get-online request packet sent by the load balance unit;
   generating, by the second control unit, the first correspondence and the third correspondence according to the second get-online request packet;
   sending, by the second control unit, the first correspondence to the load balance unit, and sending the third correspondence to the first forwarding unit; and
   receiving, by the first forwarding unit, the third correspondence sent by the second control unit, and receiving, by the load balance unit, the first correspondence sent by the second control unit.

14. The method according to claim 12, wherein the instructions, when executed by the one or more processors, cause the one or more processors to implement a third control unit; and
   before sending, by the load balance unit, the second get-online request packet to the first forwarding unit, the method further comprises:
   sending, by the load balance unit, the first get-online request packet to the third control unit;
   receiving, by the third control unit, the second get-online request packet sent by the load balance unit;
   generating, by the third control unit, the first correspondence and the third correspondence according to the second get-online request packet;
   sending, by the third control unit, the first correspondence to the load balance unit, and sending the third correspondence to the second management unit;
   receiving, by the load balance unit, the first correspondence sent by the third control unit, and receiving, by the second management unit, the third correspondence sent by the third control unit, and sending the third correspondence to the first forwarding unit; and
   receiving, by the first forwarding unit, the third correspondence sent by the second management unit.

15. The method according to claim 11, wherein the instructions, when executed by the one or more processors, cause the one or more processors to implement a fourth control unit; and the method further comprises:
   monitoring, by the fourth control unit, a forwarding unit load status in the virtual network device;
   adding, by the fourth control unit, a second forwarding unit to the virtual network device if the forwarding unit load status in the virtual network device meets a preset first expansion condition;
   generating, by the fourth control unit, a fourth correspondence after adding the second forwarding unit, wherein the fourth correspondence indicates mapping from a second user terminal to the second forwarding unit;
   sending, by the fourth control unit, the fourth correspondence to the load balance unit;
   receiving, by the load balance unit, the fourth correspondence sent by the fourth control unit;
   receiving, by the load balance unit, a second data packet from the second user terminal after receiving the fourth correspondence;
   determining, by the load balance unit, the second forwarding unit according to the second data packet and the fourth correspondence;
   sending, by the load balance unit, the second data packet to the second forwarding unit; and
   receiving and forwarding, by the second forwarding unit, the second data packet sent by the load balance unit.

16. The method according to claim 15, wherein before the receiving, by the load balance unit, the second data packet, the method further comprises:
- receiving, by the load balance unit, a third get-online request packet from the second user terminal;
- sending, by the load balance unit, the third get-online request packet to the fourth control unit; and, wherein
- generating, by the fourth control unit, the fourth correspondence after adding the second forwarding unit comprises:
  - receiving, by the fourth control unit, the third get-online request packet sent by the load balance unit; and
  - generating, by the fourth control unit, the fourth correspondence according to the third get-online request packet after adding the second forwarding unit.

* * * * *